US009188239B2

(12) United States Patent
Carter et al.

(10) Patent No.: US 9,188,239 B2
(45) Date of Patent: Nov. 17, 2015

(54) APPARATUS, METHODS AND ARTICLES OF MANUFACTURE TO CALIBRATE VALVE-MOUNTED INSTRUMENTS

(71) Applicant: Fisher Controls International, LLC, Marshalltown, IA (US)

(72) Inventors: Perry K. Carter, Ames, IA (US); Stephen G. Seberger, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 443 days.

(21) Appl. No.: 13/656,823

(22) Filed: Oct. 22, 2012

(65) Prior Publication Data

US 2013/0042476 A1 Feb. 21, 2013

Related U.S. Application Data

(63) Continuation of application No. 12/550,072, filed on Aug. 28, 2009, now Pat. No. 8,321,059.

(51) Int. Cl.
*G05D 7/06* (2006.01)
*G01F 15/00* (2006.01)
(Continued)

(52) U.S. Cl.
CPC ............ *F16K 31/122* (2013.01); *F16K 37/0041* (2013.01); *G01D 21/00* (2013.01);
(Continued)

(58) Field of Classification Search
CPC ......... B21D 53/00; F16K 17/00; F16K 17/20; F16K 31/00; F16K 31/02; F16K 31/12; F16K 31/122; F16K 37/00; F16K 37/0025; F16K 37/00041; G01D 7/00; G01D 9/00; G01D 21/00; G01F 15/00; G01F 15/005; G05D 7/00; G05D 7/06; G05D 7/0617; G06F 11/00; G06F 11/30; G06F 11/32; G06F 11/34; G06F 15/00; G06F 15/16; G06F 17/00; G06F 17/10; G06F 17/40; G06F 19/00; G06Q 50/00; G06Q 50/06; Y10T 29/00; Y10T 29/49; Y10T 29/49405
USPC .............. 29/592, 890.12; 73/1.01, 1.73, 1.88, 73/432.1, 865.8, 865.9, 866.3; 137/247, 137/251.1; 251/369; 700/1, 11, 12, 13, 17, 700/83, 90, 275, 281, 282, 302; 702/1, 33, 702/45, 50, 55, 85, 88, 100, 104, 127, 182, 702/187, 189; 708/100, 105, 200
See application file for complete search history.

(56) References Cited

U.S. PATENT DOCUMENTS 2,827,767 A * 3/1958 Hill .................................. 91/36
3,136,333 A * 6/1964 Griswold ...................... 137/489
(Continued)

FOREIGN PATENT DOCUMENTS

JP S6466403 3/1989
JP H04282004 10/1992
(Continued)

OTHER PUBLICATIONS

International Searching Authority, "International Search Report," issued in connection with international application serial No. PCT/US2010/040441, issued Dec. 15, 2012, 4 pages.
(Continued)

*Primary Examiner* — Edward Cosimano
(74) *Attorney, Agent, or Firm* — Hanley, Flight & Zimmerman, LLC

(57) ABSTRACT

Example methods, apparatus and articles of manufacture to calibrate valve-mounted instruments, such as a position controllers and/or a position transmitter, are described. An example method disclosed herein includes securing a position of a flow control member of a control valve assembly to prevent movement of the flow control member and installing a controller to the control valve assembly. The method includes activating a user interface of the controller after the controller is coupled to the control valve assembly, entering a position sensor sensitivity value and a single-point position value, the single-point position value being representative of the secured position of the flow control member, applying a single-point calibration value, placing the controller in a control mode, and releasing the position of the flow control member, the controller to self-calibrate during operation of the control valve assembly based on the position sensor sensitivity value and the single-point position value while the control valve assembly is in operation.

20 Claims, 15 Drawing Sheets

(51) Int. Cl.
| | |
|---|---|
| *G01D 21/00* | (2006.01) |
| *G06F 17/40* | (2006.01) |
| *G06F 19/00* | (2011.01) |
| *F16K 31/122* | (2006.01) |
| *F16K 37/00* | (2006.01) |

(52) U.S. Cl.
CPC ............... *G01F 15/005* (2013.01); *G05D 7/06* (2013.01); *G06F 17/40* (2013.01); *G06F 19/00* (2013.01); *Y10T 29/49405* (2015.01); *Y10T 137/7761* (2015.04); *Y10T 137/8359* (2015.04)

(56) References Cited

U.S. PATENT DOCUMENTS

| | | | |
|---|---|---|---|
| 4,694,390 | A | 9/1987 | Lee |
| 4,816,987 | A | 3/1989 | Brooks et al. |
| 5,197,328 | A | 3/1993 | Fitzgerald |
| 5,711,507 | A | 1/1998 | Berget et al. |
| 6,358,327 | B1 | 3/2002 | Pokharna et al. |
| 6,494,181 | B2 | 12/2002 | Kuretake |
| 6,554,248 | B2 | 4/2003 | Taniguchi et al. |
| 8,321,059 | B2 * | 11/2012 | Carter et al. .......... 700/282 |
| 2001/0037159 | A1 | 11/2001 | Boger et al. |
| 2002/0129799 | A1 | 9/2002 | Wang et al. |
| 2005/0154345 | A1 | 7/2005 | Milleker et al. |
| 2011/0048556 | A1 | 3/2011 | Carter et al. |

FOREIGN PATENT DOCUMENTS

| | | |
|---|---|---|
| JP | H11166655 | 6/1999 |
| WO | WO 2011/031368 A1 * | 3/2011 |
| WO | WO 2014/066209 A1 * | 5/2014 |

OTHER PUBLICATIONS

International Searching Authority, "Written Opinion of the International Search Report," issued in connection with international application serial No. PCT/US2010/040441, issued Dec. 15, 2012, 6 pages.

Metso, "Neles ND9000—Intelligent Valve Controller," <http://www.metso.com/automation/index.nsf/FR?ReadForm&ATL+/Automation/valve_prod.nsf/WebWID/WTB-041120-2256F-51B79>, Webpage retrieved Mar. 9, 2009, 2 pages.

Metso, "ND9000 Valve Controller; Pocket Reference Guide for Revision 2, 2.x," Jun. 2008, 28 pages.

Metso, "ND9000 Intelligent Valve Controller," Product Bulletin, 7 ND91 20EN, Issue Oct. 2004, 6 pages.

United States Patent and Trademark Office, "Notice of Allowance," issued in connection with U.S. Appl. No. 12/550,072, mailed Jul. 20, 2012, 39 pages.

United States Patent and Trademark Office, "Final Office Action," issued in connection with U.S. Appl. No. 12/550,072, mailed Apr. 13, 2012, 23 pages.

United States Patent and Trademark Office, "Non-Final Office Action," issued in connection with U.S. Appl. No. 12/550,072, mailed Nov. 3, 2011, 17 pages.

Japanes Patent Office, "Notice of Reasons for Refusal," issued in connection with Japanese Patent Application No. 2012-526743, with non-certified machine English translation, mailed Jun. 4, 2014, 5 pages.

International Searching Authority, "International Search Report," issued in connection with International Patent Application No. PCT/US2013/065839, mailed on Feb. 4, 2014, 4 pages.

International Searching Authority, "Written Opinion of the International Searching Authority," issued in connection with International Patent Application No. PCT/US2013/065839, mailed on Feb. 4, 2014, 5 pages.

The International Bureau, "International Preliminary Report on Patentability," issued in connection with International Patent Application No. PCT/US2013/065839, mailed on May 7, 2015, 6 pages.

* cited by examiner

APPARATUS, METHODS AND ARTICLES OF MANUFACTURE TO CALIBRATE VALVE-MOUNTED INSTRUMENTS

CROSS REFERENCE TO RELATED APPLICATION

This patent arises from a continuation of U.S. patent application Ser. No. 12/550,072, filed Aug. 28, 2009, now U.S. patent No. 8,321,059,entitled "Apparatus, Methods and Articles of Manufacture to Calibrate Valve-Mounted Instruments," which is incorporated herein by reference in its entirety.

FIELD OF DISCLOSURE

This disclosure relates generally to valves and, more particularly, to methods, apparatus and articles of manufacture to calibrate valve-mounted instruments.

BACKGROUND

Process plant elements, such as valves, typically have associated mounted instruments, such as a valve position controller and/or a position transmitter, that control the elements and/or transmit information about the element to implement one or more desired process(es) and/or operation(s) within a process plant. An example valve assembly includes a diaphragm-type or piston-type pneumatic actuator, which is controlled by an electro-pneumatic valve position controller. Example electro-pneumatic valve position controllers receive one or more control signals (e.g., a 4-20 milliamps (mA) control signal, a 0-10 volts direct current (VDC) control signal, a digital control signal, etc.), and convert the control signal(s) into one or more pneumatic pressures that are provided to the pneumatic actuator to open, close or hold a position of a corresponding valve. For example, if a process control routine determines that a pneumatically-actuated normally-closed stroke-type valve is to permit the passage of a greater volume and/or rate of flow of a process fluid, the magnitude of the control signal supplied to the electro-pneumatic valve position controller associated with the valve may be increased from 4 mA to 8 mA, assuming the use of a current type of control signal.

In some examples, the electro-pneumatic valve position controller uses a feedback signal generated via a feedback sensing system or element, such as a position sensor. Such feedback signals represent the position of the pneumatic actuator and the corresponding valve. The valve position controller compares the feedback signal to a control signal representing a desired set-point or desired valve position (e.g., 35% open), and determines whether to adjust one or more of the pneumatic pressures provided to the actuator. For the valve position controller, the actuator and the valve combination to operate as intended within the process plant, the valve position controller may need to be calibrated to the feedback-sensing element.

SUMMARY

Example methods, apparatus and articles of manufacture to calibrate valve-mounted instruments, such as a position controller and/or a position transmitter are disclosed. A example method disclosed herein includes securing a position of a flow control member of a control valve assembly to prevent movement of the flow control member and installing a controller to the control valve assembly. The method includes activating a user interface of the controller after the controller is coupled to the control valve assembly, entering a position sensor sensitivity value and a single-point position value, the single-point position value being representative of the secured position of the flow control member, applying a single-point calibration value, placing the controller in a control mode, and releasing the position of the flow control member, the controller to self-calibrate during operation of the control valve assembly based on the position sensor sensitivity value and the single-point position value while the control valve assembly is in operation.

An example method disclosed herein includes coupling a controller to a control valve assembly while the control valve assembly is in service or in-line with a process control system, providing a position sensor sensitivity value to the controller, providing a single-point position value representative of a current position of a flow control member of the control valve assembly, inputting an estimated upper stroke limit value representative of a first travel span limit of the flow control member and an estimated lower stroke limit value representative of a second travel span limit of the flow control member based on the position sensor sensitivity value and the single-point position value, and activating the controller to allow operation of the control valve assembly to control fluid flow of the process control system, the controller to calibrate during operation of the control valve assembly based on the position sensor sensitivity value and the single-point position value.

An example method disclosed herein includes locking a position of a flow control member of a control valve assembly while the valve control assembly is in a fluid system, initiating a calibration of a controller that operates the control valve assembly, inputting a pre-determined position sensor sensitivity value to the controller via a user interface, inputting a single-point position value representative of the locked position of the flow control member relative to a travel span of the flow control member, obtaining estimated upper and lower calibration values from the controller based on the position sensor sensitivity value and the single-point position value, inputting the estimated upper and lower calibration values via the user interface, activating the controller, and unlocking the flow control member to enable the control valve assembly to control the fluid system, the controller to calibrate based on the single-point position value, the position sensor sensitivity value and the estimated upper and lower calibration values.

DETAILED DESCRIPTION

Figure 1:
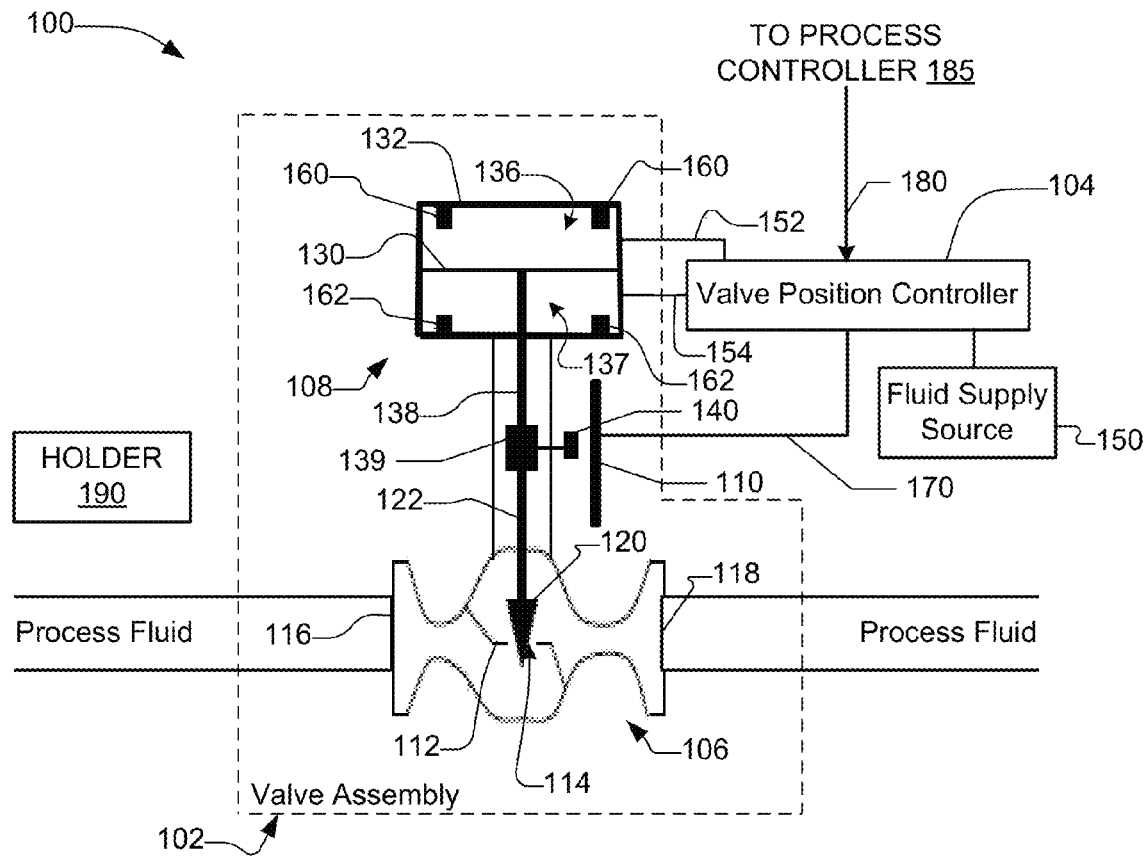
FIG. 1 illustrates an example valve apparatus having a valve position controller that can be calibrated using the example methods and apparatus described herein.

To calibrate some valves, it is necessary to stroke the valve between one extreme travel end point or position (e.g., a fully opened position) and another extreme travel end point or position (e.g., a fully closed position). However, such methods are disadvantageous because they require that the valve be taken out-of-service or off-line to fully stroke the valve. However, in some instances, a process system cannot be disrupted or shut down to facilitate valve position controller and/or position transmitter calibration. Even when a process system can be disrupted, such disruptions may have undesired monetary and/or efficiency impacts. While a bypass line could be used to isolate the valve and keep the process system on-line, bypass lines are not always desirable, available or feasible.

Additionally or alternatively, some valve position controllers and/or position transmitters may be calibrated using a bench, test or calibration valve, actuator and position sensor having substantially similar or identical characteristics (e.g., stroke length, travel end points, etc.) to the valve, actuator and position sensor to which the valve position controller and/or position transmitter will be installed. The test valve, actuator and position sensor may be located, for example, in a maintenance shop or lab remotely located from an actual process plant. In the lab or shop, the test valve, actuator and position sensor may be fully or completely stroked in order to calibrate the new and/or replacement valve position controller and/or position transmitter. After calibration, the calibrated valve position controller and/or position transmitter is removed from the test set-up and operatively coupled or mounted to the target valve actuator within the process plant. Although effective, such a calibration method may be time consuming and requires the availability of suitable test devices.

To overcome at least these deficiencies, the example valve position controllers and position transmitters described herein can self-calibrate using a single externally-provided position value that represents an estimate of the current position (e.g., 70% closed) of the valve assembly (i.e., the valve, actuator and position sensor considered collectively) to which the valve position controller is, was and/or will be installed. In the examples described herein, no additional position values need to be provided to the valve position controller or position transmitter prior to operation of the valve position controller or position transmitter within the process plant. The single position value can be easily and/or readily determined and/or estimated by an installer by, for example, visually examining and/or measuring the current position of the valve assembly during installation of the valve position controller. The installer inputs and/or provides the measured or estimated current position value into the valve position controller or position transmitter using, for example, a user interface. Based on the provided measured or estimated current position value, the example valve position controllers and position transmitters described herein learn, adapt and/or self-calibrate during subsequent operation of the valve assembly within an operating process plant. Accordingly, the methods and apparatus to calibrate valve position controllers and position transmitters described herein can be used without having to take an associated portion of a process plant off-line or out-of-service, without a need to stroke, adjust or reposition the valve, without the need for a bypass line, and without the need for a bench, test or calibration valve assembly.

FIG. 1 illustrates an example valve apparatus 100 including a valve assembly 102, and a valve position controller 104 constructed in accordance with the teachings of this disclosure. While example methods and apparatus to calibrate valve position controllers are described with reference to the example valve assembly 102 of FIG. 1, it should be understood that the example methods and apparatus described herein may be used to calibrate valve position controllers for use with any number and/or type(s) of additional or alternative valve assemblies. For example, while a valve 106 depicted in FIG. 1 is a sliding stem control valve, the example methods and apparatus to calibrate valve position controllers may be used with any other type(s) of valves including, but not limited to, rotary control valves, quarter-turn control valves, etc. Additionally or alternatively, while an example actuator 108 of FIG. 1 is depicted as a double-acting piston actuator, any other type(s) of actuators, such as a rotating actuator, a single-acting spring return diaphragm or piston actuator, may alternatively be used. It should be further understood that the single position value calibration methods and apparatus described herein may be used in connection with any number and/or type(s) of other controllable devices such as, but not limited to, dampers, elevators, lifting devices, scales, etc. Accordingly, the example of FIG. 1 is merely an illustrative example for purposes of discussion, and the scope of coverage of this patent is not limited thereto.

The example valve assembly 102 of FIG. 1 includes the valve 106, the pneumatic actuator 108 and a position sensor 110. The example valve 106 of FIG. 1 has a valve seat 112 disposed therein to define an orifice 114 that provides a fluid flow passageway within the valve 106 between openings 116 and 118. The example actuator 108 of FIG. 1 is operatively coupled to a flow control member 120 via a valve stem 122, which may move the flow control member 120 in a first direction (e.g., away from the valve seat 112) to allow a greater fluid flow between the openings 116 and 118, and may move the flow control member 120 in a second direction (e.g., toward the valve seat 112) to further restrict or prevent fluid flow between the openings 116 and 118.

The example pneumatic actuator 108 of FIG. 1 includes a piston 130 disposed within a housing 132 to define a first chamber 136 and a second chamber 137. An actuator stem 138 is connected to the piston 130 and operatively coupled to the valve stem 122 via a connector 139 having an associated travel indicator 140. The flow rate permitted through the valve 106 is controlled by adjusting the position of the piston 130 relative to the housing 132 to adjust the position of the flow control member 120 relative to the valve seat 112 and, thus, the position of the valve 106.

To control the position of the example piston 130, the example electro-pneumatic valve position controller 104 of FIG. 1 supplies control fluid (e.g., pressurized air, hydraulic fluid, etc.) from a fluid supply source 150 to the first chamber 136 via a first passageway 152 and to the second chamber 137 via a second passageway 154. The pressure differential present across the example piston 130, if any, determines whether the piston 130 is stationary or moving. For example, to move the piston 130 in a first direction (e.g., a downward direction in the orientation of FIG. 1), the valve position controller 104 supplies control fluid to the first chamber 136 at a greater pressure than control fluid provided to the second chamber 137, thereby exerting a net downward force on the piston 130. Movement of the piston 130 in this first downward direction causes the actuator stem 138, the valve stem 122 and, thus, the flow control member 120 to move toward the valve seat 112, thereby further preventing or restricting fluid flow through the orifice 114. Conversely, to move the piston 130 in a second direction (e.g., an upward direction in the orientation of FIG. 1), the valve position controller 104 supplies control fluid to the first chamber 136 at a lesser pressure than control fluid provided to the second chamber 137, thereby, exerting a net upward force on the piston 130. Movement of the piston 130 in this second upward direction causes the actuator stem 138, the valve stem 122 and, thus, the flow control member 120 to move away from the valve seat 112, thereby permitting a greater fluid flow through the orifice 114.

Figure 2A:
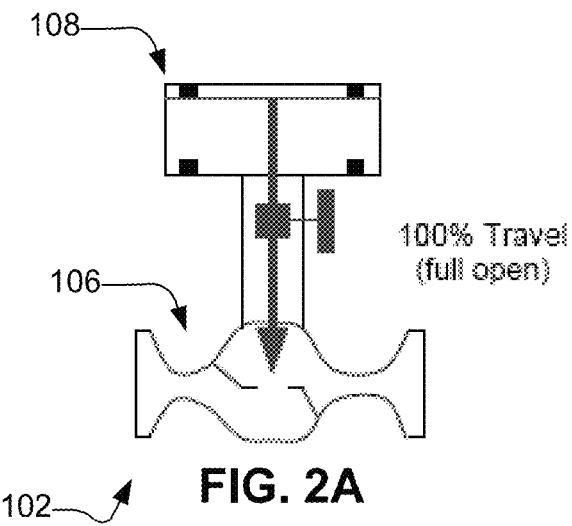
FIGS. 2A-2C depict example states of the example valve assembly of FIG. 1.
Figure 2B:
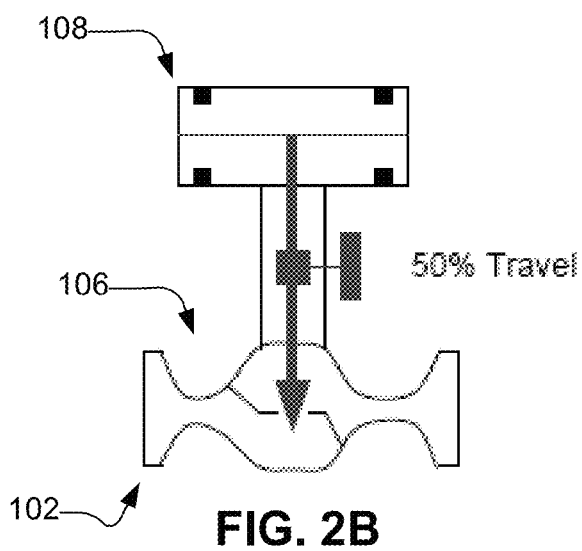
Figure 2C:
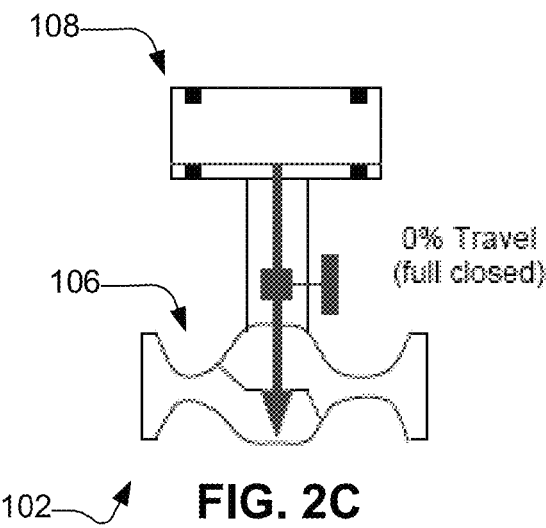

In the illustrated example of FIG. 1, the actuator 108 includes travel stops 160 and 162. The example travel stops 160 correspond to a fully-open or 100% travel span position of the actuator 108 (see FIG. 2A), that is, a maximum or highest travel end point. The example travel stops 162 correspond to a fully-closed or 0% travel position of the actuator 108 (see FIG. 2C), that is, a minimum or lowest travel end point. FIG. 2B depicts the piston 130 being positioned halfway between the stops 160 and 162 and, thus, corresponds to a 50% travel position. In some examples, the travel stops 160 and/or 162 are adjustable.

Returning to FIG. 1, to measure the position of the actuator 108, the example valve assembly 102 of FIG. 1 includes the example position sensor 110. The example position sensor 110 of FIG. 1 measures and/or senses the position of the travel indicator 140 relative to the stationary position sensor 110 and outputs and/or provides a signal 170 that represents the current position of the travel indicator 140 and, thus, the position of the valve 106 (e.g., as a percentage open or span). An example position sensor 110 is a linear array of Hall-effect sensors that outputs an analog signal 170 having different values (e.g., voltages or currents) for different positions of the travel indicator 140. The example analog signal 170 of FIG. 1 represents absolute travel or position of the travel indicator 140. For example, assuming the actuator 108 has a stroke length of 100 millimeters (mm) and the position signal 170 varies between 0 and 40 millivolts (mV), when the valve stem 122 is moved 10%, the analog signal 170 changes by 4 mV, which is 10% of 40 mV. The analog signal 170 has a first present travel value and/or voltage (PTV) when the travel indicator 140 is at a first position corresponding to the piston 130 being in contact with the stops 162 (FIG. 2C), has a second PTV when the travel indicator 140 is at a second position corresponding to the piston 130 being in contact with the stops 160 (FIG. 2A), and has a range of possible PTVs between the first and second PTVs when the travel indicator 140 is between the first and second positions. For example, if the piston 130 is halfway between the stops 160 and 162 (FIG. 2B), the analog signal 170 has a PTV that is halfway between the first and second PTVs. In some examples, the position sensor 110 may measure a larger range of motion than the range of motion physically supported by the actuator 108, that is, the length of the position sensor 110 may be longer than the full stroke length of the actuator 108. While the example position sensor 110 of FIG. 1 outputs an analog signal 170, a position sensor may, additionally or alternatively, output a digital signal having digital values representative of the relative position of the travel indicator 140. Further, the analog signal 170 output by the position sensor 110 may be converted to a digital signal by the valve position controller 104 prior to processing.

Figure 6:
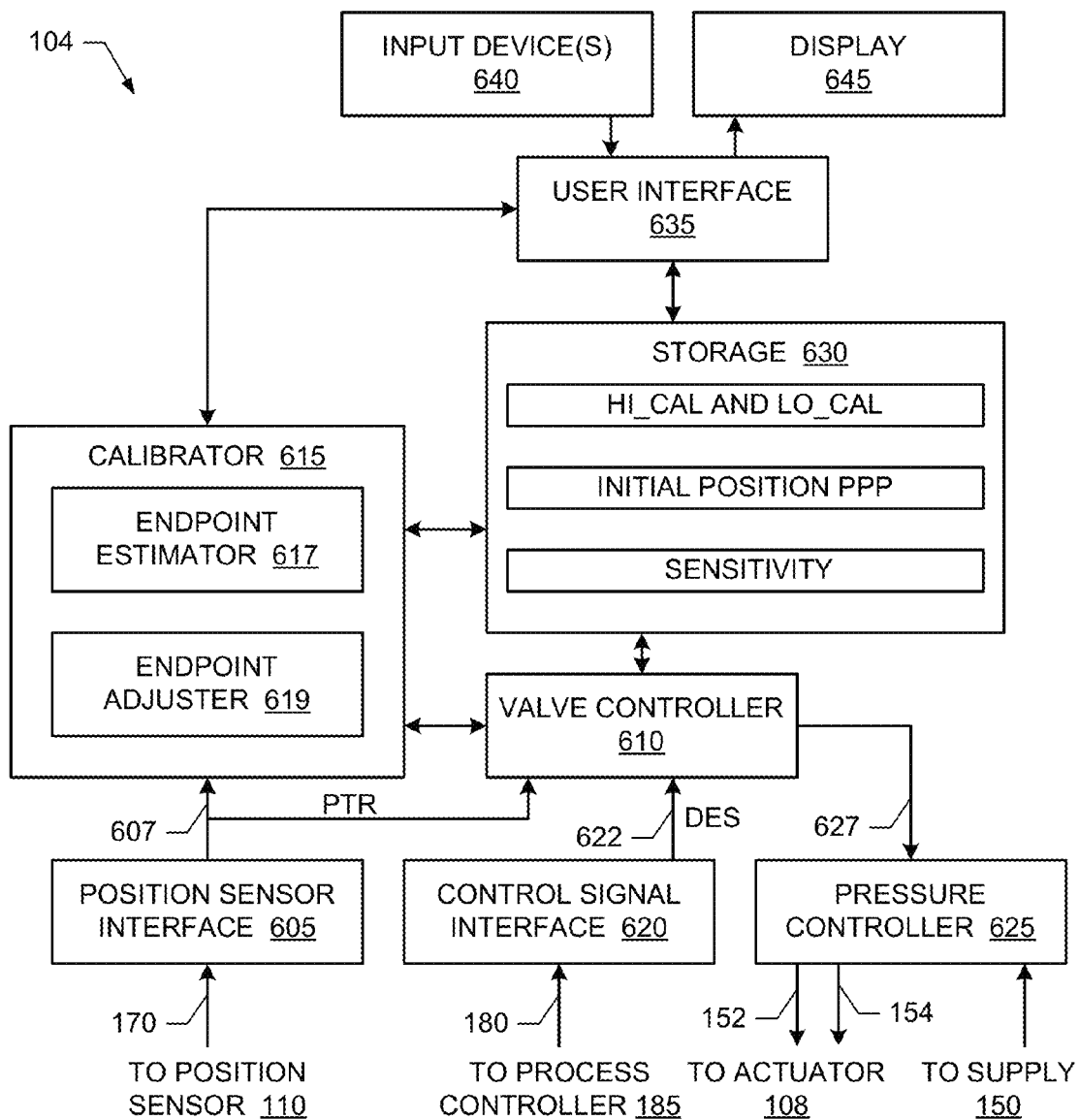
FIG. 6 illustrates an example manner of implementing the example valve position controller of FIG. 1.

The example valve position controller 104 of FIG. 1 can self-calibrate from a single externally-provided position value PPP that represents the current position (e.g., 70% open) of the actuator 108, or an estimate and/or approximation thereof. As described herein, no additional externally-provided position values are needed by the valve position controller 104 prior to start of operation of the valve position controller 104 within a process plant. Further, the position of the actuator 108 need not be adjusted, changed or stroked prior to operation of the example valve apparatus 100 of FIG. 1 within the process plant. The single position value PPP may be easily and/or readily determined and/or estimated by an installer by, for example, visually examining (e.g., estimating) and/or measuring the current position of the position indicator 140 during, for example, installation of the valve position controller 104. The installer provides and/or inputs the estimated or measured position value PPP into the valve position controller 104 via, for example, an input device 640 of the valve position controller 104 (FIG. 6). While the example valve position controller 104 may self-calibrate based on a single estimated position value, when additional position values are available, either estimated or measured values provided by an installer and/or determined by stroking the valve 106, such additional values may be utilized to, for example, improve calibration accuracy.

Figure 3:
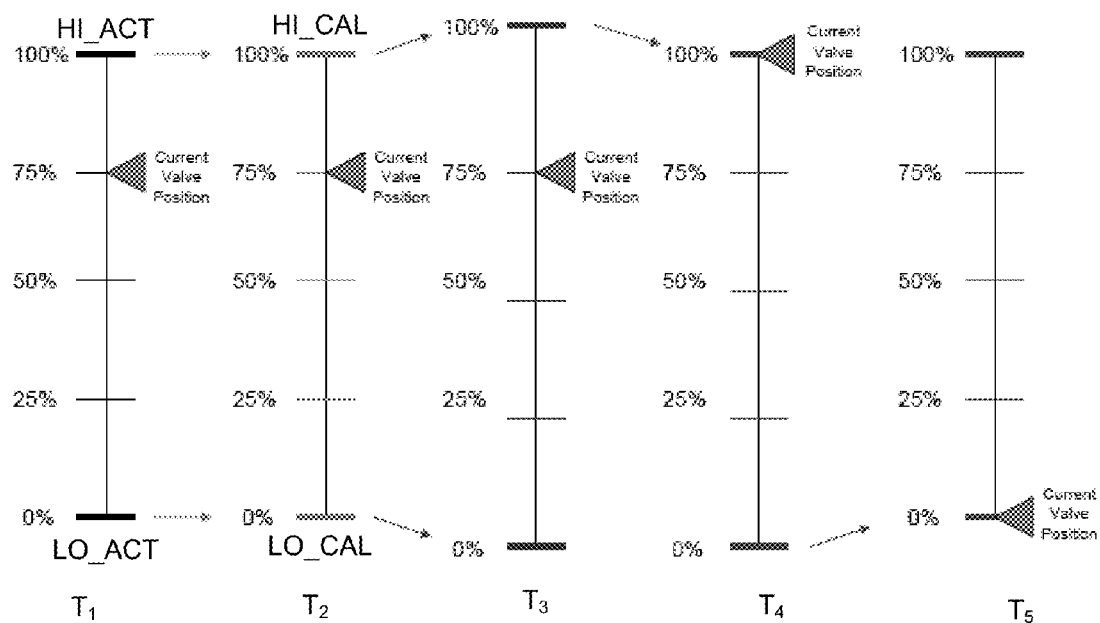
FIGS. 3, 4, and 5 illustrate example calibration operations that may be implemented by the example valve position controller of FIG. 1.

Based on the single estimated position value PPP and a sensitivity value SENSITIVITY that represents a change in the PTV 170 per unit of distance of travel of the position indicator 140, and a full-stroke distance value for the valve, the example valve position controller 104 of FIG. 1 estimates PTVs 170 that are expected and/or predicted to correspond to travel endpoints of the valve actuator 108. Alternatively, the value SENSITIVITY represents the number of counts that represent a full stroke of the valve 106. Further still, the value SENSITIVITY can represent the change in PTV 170 over a full stroke of the valve 106. Referring to FIG. 3, at a time T1, the example valve assembly 102 of FIG. 1 is 75% open and has a PTV 170 corresponding to the current 75% position, would have a PTV 170 of HI_ACT when the actuator 108 is in the fully-open 100% position, and would have a PTV value 170 of LO_ACT when the actuator 108 is in the fully-closed 0% position. At a time T2, the valve position controller 104 computes a first value HI_CAL corresponding to an estimated or expected fully-open position of the actuator 108, and computes a second value LO_CAL corresponding to an estimated or expected fully-closed position of the actuator 108. If the values of PPP and SENSITIVITY are substantially accurate, the value of HI_CAL is substantially equal to HI_ACT and the value of LO_CAL is substantially equal to LO_ACT. However, in practice, the value of PPP is an estimate (e.g., a measured value having an error) of the position of the actuator 108 and/or the value of SENSITIVITY may be inaccurate due to manufacturing tolerances and/or installation alignment variation. Accordingly, in some examples the example valve position controller 104 of FIG. 1 purposefully adjusts the estimated endpoint values so that the estimated and/or predicted travel range represented by HI_ACT and LO_ACT encompasses a larger travel range of the actuator 108, as shown at time T3.

The values of HI_ACT and LO_ACT may be computed using the following mathematical expressions, assuming the feedback signal 170 increases as the valve 104 opens:

$$HI\_CAL = PTV + (100 - PPP) * (1 + RAF) * SENSITIVITY, \text{ and} \quad \text{EQN (1)}$$

$$LO\_CAL = PTV - PPP * (1 + RAF) * SENSITIVITY, \quad \text{EQN (2)}$$

where RAF is a range adjustment factor of, for example, 0.1 that results in the value of HI_CAL being increased by 10% and the value of LO_CAL being decreased by 10%, and the value of PPP is expressed as a percentage of the travel range of the actuator 108. If instead the feedback signal 170 decreases as the valve 104 opens, then the following mathematical expression may be used to compute the values of HI_ACT and LO_ACT:

$$HI\_CAL=PTV+PPP*(1+RAF)*SENSITIVITY, \text{ and} \qquad \text{EQN (3)}$$

$$LO\_CAL=PTV-(100-PPP)*(1+RAF)*SENSITIVITY. \qquad \text{EQN (4)}$$

Using any number and/or type(s) of method(s), algorithm(s) and/or logic, the example valve position controller 104 of FIG. 1 compares the PTV 170 generated by the position sensor 110 to a control signal 180 received from a process controller 185, which represents a desired position and/or setpoint (SP) of the valve 106 (e.g., 40% open), to determine how the pressure(s) of control fluid provided to the chambers 136 and 137 should be adjusted and/or maintained based on the estimated endpoint values HI_CAL and LO_CAL. For example, based on HI_CAL and LO_CAL, the example valve position controller 104 computes a value TARGET for the position signal 170 that corresponds to the desired position of the valve 106. The valve position controller 104 then adjusts the pressures in the chambers 136 and 137 until the actual PTV 170 substantially matches or equals the value TARGET. The value TARGET may be computed using the following mathematical expression:

$$TARGET=LO\_CAL+SP*(HI\_CAL-LO\_CAL)/100. \qquad \text{EQN (5)}$$

As the example valve apparatus 100 of FIG. 1 operates within a process plant, the example valve position controller 104 adapts, adjusts and/or updates the estimated endpoint values HI_CAL and LO_CAL using any number and/or type(s) of algorithm(s), logic, criteria and/or method(s). When, during operation of process plant, the piston 130 reaches any of its physical travel stops 160, 162, the example valve position controller 104 adjusts the corresponding calibrated endpoint value HI_CAL, LO_CAL. Detection of when the piston 130 reaches a stop 160, 162 may be performed by detecting that the PTV 170 no longer changes even though a pressure being applied to the piston 130 should result in movement of the piston 130. For example, at time T4 in FIG. 3, the 100% fully-open stops 160 are reached, and the valve position controller 104 updates the value of HI_CAL to match the current value PTV 170, which equals HI_ACT. Likewise, when at time T5 the 0% the fully-closed stops 162 are reached, the valve position controller 104 updates the value of LO_CAL to match the current PTV 170, which equals LO_ACT.

In some circumstances, detrimental valve positioning effects may occur using the example calibration method illustrated in FIG. 3. In the illustrated example of FIG. 3, the calibration values HI_CAL and LO_CAL are fully adjusted whenever the piston 130 reaches the corresponding travel stop 160, 162, potentially resulting in the valve 106 being moved away from the corresponding endpoint 160, 162. For example, if the piston 130 was to reach the fully-closed stops 162 at a position SP 180 of 5% open, and the value of LO_CAL were to be immediately and completely adjusted as described above, the valve position controller 104 would immediately respond by opening the valve 160 to 5%, causing an abrupt change in process fluid flow. Such a change in valve position may disrupt an ongoing process and/or have other negative consequences.

Returning to FIG. 1, to reduce the likelihood of such effects, another example self-calibration method adjusts the calibration values HI_CAL and LO_CAL only when the process controller 104 moves the SP 180 beyond a value where the valve 106 reaches one of its travel limits. Under such circumstances, the appropriate HI_CAL or LO_CAL value can be adjusted without causing the position of the valve 106 to change. When the SP signal 180 actually reaches both 0% and 100%, the calibration of the corresponding endpoint HI_CAL, LO_CAL is complete. Otherwise, calibration of that endpoint HI_CAL, LO_CAL remains partially incomplete.

Assuming the initial values of LO_CAL and HI_CAL are computed to represent an expanded travel range, as described above in connection with FIG. 3, when the valve controller 104 detects that the valve 106 has reached 0%, e.g. by detecting that the actuator pressure is loading the piston 130 against the stops 162, the value of LO_CAL may be updated using the following mathematical expression:

$$LO\_CAL=HI\_CAL-(HI\_CAL-PTV)*100/(100-SP). \qquad \text{EQN (6)}$$

If the value of the SP 180 is less than 0%, the value of SP 180 should be set to 0% in EQNS (6)-(9). To reduce possible control errors due to, for example, inaccurate signal biases present in the position feedback signal 170, the following mathematical expression may be used to update the value of LO_CAL to include a 1% safety factor:

$$LO\_CAL=HI\_CAL-(HI\_CAL-PTV)*101/(100-SP). \qquad \text{EQN (7)}$$

The value of HI_CAL may be likewise updated using one of the following mathematical expressions when the valve controller 104 detects that the valve 106 has reached its 100% open physical stop e.g. by detecting that the actuator pressure has loaded the piston 130 against the stops 160.

$$HI\_CAL=LO\_CAL+(PTV-LO\_CAL)*100/SP \qquad \text{EQN (8)}$$

$$HI\_CAL=LO\_CAL+(PTV-LO\_CAL)*101/SP. \qquad \text{EQN (9)}$$

As with EQN (7), EQN (9) includes a 1% safety factor.

Figure 4:
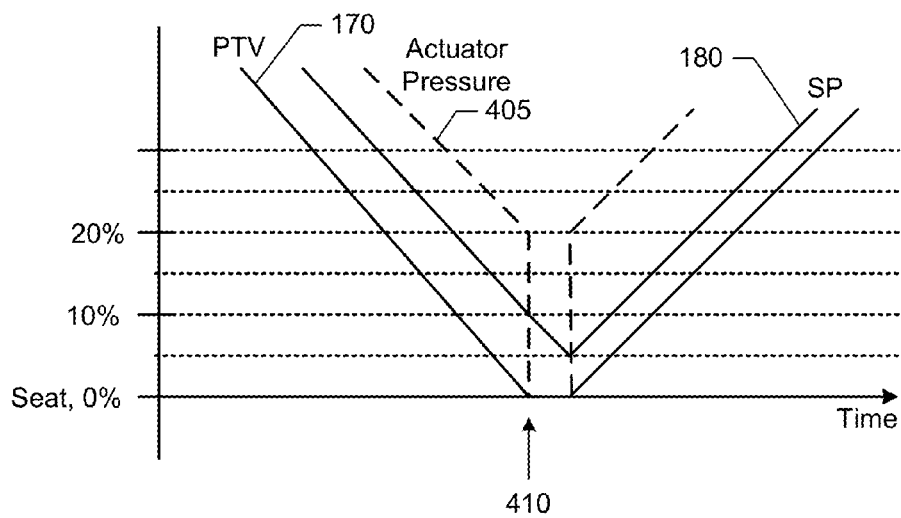

FIG. 4 illustrates an example update of LO_CAL using the example expression of EQN (6) or EQN (7). In the example of FIG. 4, the actuator pressure 405 decreases during the course of normal operation. At some time 410, the SP 180 falls below the value at which the actuator 108 reaches the fully-closed 0% position. However, due to inaccurate calibration, the SP 180 is still above 0%. Because of the controller gain, the actuator pressure 405 rapidly decreases as the SP 180 continues to decrease. The example valve position controller 104 of FIG. 1 recognizes from the low actuator pressure 405 that the actuator 108 is fully closed, and updates LO_CAL to a new minimum value using one of the mathematical expressions of EQN (6) or EQN (7), thereby improving the accuracy of the value of LO_CAL by 5% in the example of FIG. 4. If the SP 180 had been driven all the way to the 0% position, the calibration of LO_CAL would have been substantially ideal. In some examples, EQN (6) or EQN (7) is repeatedly applied while the actuator 108 remains at the fully-closed 0% position and the SP 180 is changing. Additionally or alternatively, EQN (6) or EQN (7) is applied for the smallest value of SP 180 that occurs while the actuator 108 is at the fully-closed 0% position.

Returning to FIG. 1, in some examples, appropriate ones of the updates shown in EQNS (6)-(9) are applied each time and/or while the piston 130 is at a corresponding travel stop 160, 162.

In still other examples, when the SP 180 reaches the value where the valve 106 reaches one of its travel limits, the example valve position control 104 of FIG. 1 records the PTV 170. Thereafter, whenever the SP 180 is changing by an amount that precludes activation by noise, the example valve position controller 104 applies a small correction to the corresponding calibration value LO_CAL, HI_CAL that reduces the difference between the recorded PTV 170 and the corresponding calibration value LO_CAL, HI_CAL. By slowly changing the calibration values LO_CAL and HI_CAL overtime while the SP 180 is changing, disruptions to any ongoing process(es) can be reduced, minimized and/or eliminated. In some examples, the rate of application of the calibration correction is limited to 0.1% of the total travel span per minute, or, one travel count per minute. Depending on the dynamic nature of the SP 180 (e.g., how much and/or at what rate the SP 180 changes), the rate of calibration correction may need to be reduced and/or may be increased.

Figure 5:
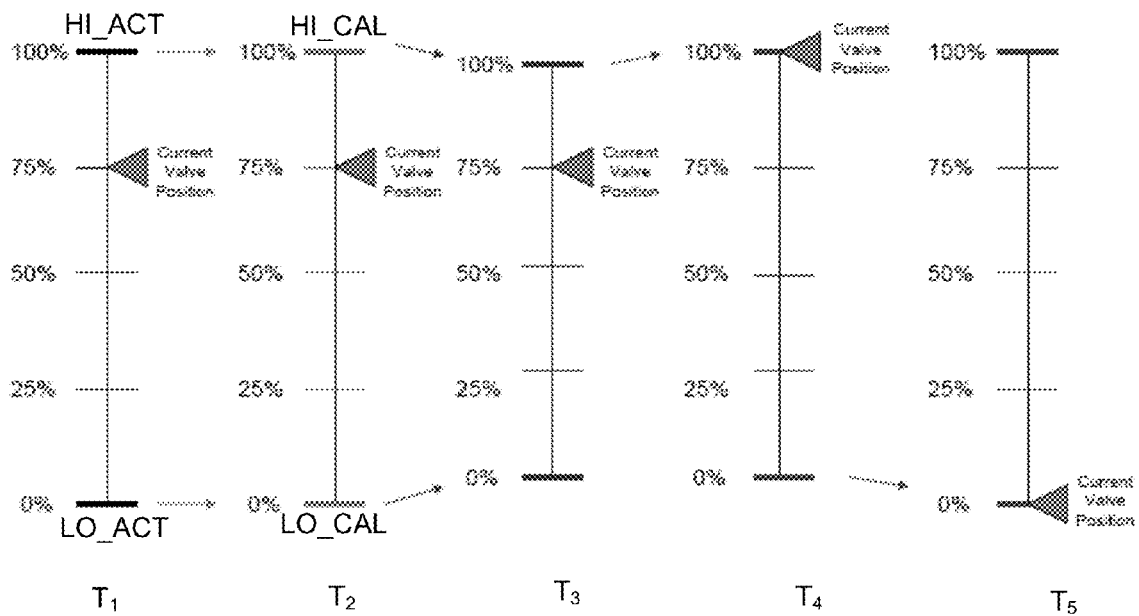

While the examples described above were based on initially and purposefully expanded calibration values HI_CAL and LO_CAL, alternatively, the valve position controller 108 may initially underestimate the travel range of the actuator 108, as shown in FIG. 5. The compressed calibration values HI_CAL and LO_CAL may be computed using, for example, EQNS (1)-(4) with an RAF of −0.1. When at time T4, the actuator 108 is still moving due to a pressure differential across the chambers 136, 137 but the value PTV 170 has exceeded the present value of HI_CAL, the value of HI_CAL is adjusted to reflect the present value PTV. The lower estimated travel limit LO_CAL is likewise adjusted, as depicted at time T5. In instances where the SP 180 cannot exceed the values corresponding to 0% to 100% valve position, the valve 106 may not reach its travel endpoint and, thus, calibration of the HI_CAL and LO_CAL values as illustrated in FIG. 5 may not be possible.

Assuming the SP 180 can exceed the values corresponding to 0% and 100% valve positions, the HI_CAL and LO_CAL calibration values may, additionally or alternatively, be adjusted by detecting when the SP 180 exceeds the 0-to-100% range. In some examples, the valve position controller 104 implements cutoffs, which intentionally fully loads the actuator 108 into one of the set of mechanical stops 160, 162 when the SP 180 reaches a respective predefined value (e.g., 5% or 95%). In such examples, it may be beneficial to deactivate cutoffs when using initially compressed calibration values HI_CAL and LO_CAL. When SP 180 exceeds this range and is moving by an amount that precludes activation by noise, and the actuator pressure is not loading the piston 130 into the corresponding stops 160, 162, the example valve position controller 104 adjusts the corresponding calibration value HI_CAL, LO_CAL by a small amount that causes the actuator 108 to move toward and/or load into the stops 160, 162. Over time, one or more the above conditions will no longer be met and calibration will be substantially complete. In some examples, the calibration value HI_CAL, LO_CAL is repeatedly adjusted while piston 130 is not loaded, and the SP 180 is changing and outside of the 0-to-100% range. Additionally or alternatively, the calibration value HI_CAL, LO_CAL is adjusted using the most out of range value of SP 180 that occurred while the piston 130 was not loaded.

In still other examples, when the SP 180 reaches the value where the valve 106 reaches one of its travel limits, the example valve position control 104 of FIG. 1 records the PTV 170. Thereafter, whenever the SP 180 is changing by an amount that precludes activation by noise, the example valve position controller 104 applies a small correction to the corresponding calibration value LO_CAL, HI_CAL that reduces the difference between the recorded PTV 170 and the corresponding calibration value LO_CAL, HI_CAL. By slowly changing the calibration value LO_CAL, HI_CAL over-time while the SP 180 is changing, disruptions to any ongoing process(es) can be reduced, minimized and/or eliminated. In some examples, the rate of application of the calibration correction is limited to 0.1% of the total travel span per minute, or one travel count per minute. Depending on the dynamic nature of the SP 180 (e.g., how much and/or at what rate the SP 180 changes), the rate of calibration correction may need to be reduced and/or may be increased.

While any of the example valve calibration methods described above may automatically apply and/or activate new LO_CAL and HI_CAL values as they are computed, additionally or alternatively, new LO_CAL and/or HI_CAL values are stored and only activated and/or applied when the valve position controller 104 is specifically instructed and/or directed. For example, the valve position controller 104 may display an indicator on a display 645 (FIG. 6) indicating that one or more new calibration values LO_CAL, HI_CAL are available for activation. When via, for example, the example input device(s) 640, a user indicates that the new and/or updated calibration values LO_CAL, HI_CAL are to be applied, the valve position controller 104 begins using the activated calibration values LO_CAL, HI_CAL during subsequent valve control operations.

In still further examples, a combination of the calibration methods described above may be implemented. For example, when it is detected that the piston 130 is loaded into the stops 160, 162 by an SP 180 that is within the 0-to-100% range, one of the calibration methods described above for an initially expanded range could be applied. However, when it is detected that the SP 180 is out of the 0-to-100% range, one of the calibration methods described above for an initially compressed range could be applied. In still more examples, rather than either purposefully expanding or compressing the initial calibration values HI_CAL and LO_CAL, the calibration values HI_CAL and LO_CAL are estimated and/or computed as accurately as possible with suitable one(s) of the calibration procedure(s) described above being applied depending on detected conditions.

Returning to FIG. 1, to secure the position of the valve assembly 102 while the valve position controller 104 is installed, configured, activated and/or computes the initial estimate endpoint values HI_CAL and LO_CAL, the example apparatus 100 of FIG. 1 includes any number and/or type(s) of holders, one of which is designated at reference numeral 190, to secure, hold and/or maintain the current position of the valve assembly. Example holders 190 include, but are not limited to, a clamp, a block, and/or a fluid trap.

FIG. 6 illustrates an example manner of implementing the example valve position controller 104 of FIG. 1. To receive the feedback position signal 170, the example valve position controller 104 of FIG. 6 includes a position sensor interface 605. Using any number and/or type(s) of circuit(s), component(s) and/or device(s), the example position sensor interface 605 of FIG. 6 conditions and/or converts the feedback signal 170 into a form suitable for processing by a valve controller 610 and/or a calibrator 615. For example, the position sensor interface 605 may convert an analog feedback signal 605 into digital values 607 that represent the current position PTV of the travel indicator 140. Additionally or alternatively, if the feedback signal 170 has a different polarity depending on whether the travel indicator 140 is above or below a midline of the position sensor 110, the position sensor interface 605 may offset the feedback signal 170 to have, for example, only positive values prior to conversion to the digital values 607.

To receive the control signal 180, the example valve position controller 104 of FIG. 6 includes a control signal interface 620. Using any number and/or type(s) of circuit(s), component(s) and/or device(s), the example control signal interface 620 of FIG. 6 conditions and/or converts the control signal 180 into a form suitable for processing by the example valve controller 610. For example, the control signal interface 620 may convert the control signal 180 into digital control values 622 that represent a desired set point and/or position SP of the actuator 108.

To control the pneumatic pressures supplied to the chambers 136 and 137, the example valve position controller 104 of FIG. 6 includes a pressure controller 625. Using any number and/or type(s) of circuit(s), component(s) and/or device(s), and based on pressure control values 627 provided by the example valve controller 610, the example pressure controller 625 determines whether to increase or decrease the pneumatic pressures provided via the lines 152 and 154.

Using any number and/or type(s) of method(s), algorithm(s) and/or logic, the example valve controller 610 of FIG. 6 compares the digital position values 607 to the desired set-point and/or position values 622, to determine the pressure control values 627, that is, how the pressure(s) of control fluid provided to the chambers 136 and 137 should be adjusted. As described above in connection with FIG. 1 and EQN (5), the valve controller 610 determines the pressure control values 627 based on the estimated endpoint values HI_CAL and LO_CAL.

To determine and update the estimated values HI_CAL and LO_CAL of the digital values 607 corresponding to the expected travel endpoints of the actuator 108, the example valve position controller 104 of FIG. 6 includes the example calibrator 615. To compute the initial pair of estimated values HI_CAL and LO_CAL based on the single externally-provided position value PPP, the example calibrator 615 includes an endpoint estimator 617. Using, for example, the mathematical expressions of EQNS (1)-(4), the example endpoint estimator 617 computes the initial values HI_CAL and LO_CAL.

To update, during operation of the example valve apparatus 100 of FIG. 1 within a process plant, the values HI_CAL and LO_CAL corresponding to the expected travel endpoints of the actuator 108, the example calibrator 615 includes an endpoint adjuster 619. Using, for example, any of the example methods described above in connection with FIGS. 1 and 3-5 and/or the example mathematical expressions of EQNS (6)-(9), the example endpoint adjuster 619 updates the values of HI_CAL and LO_CAL during on-line operation of the valve position controller 104. It should be understood that the example endpoint adjuster 619 could, additionally or alternatively, be used to compute and/or update the HI_CAL and LO_CAL were the valve 106 to be purposefully stroked for calibration purposes.

To store control variables, the example valve position controller 104 of FIG. 6 includes storage 630. Control variables may be stored in the storage 630 using any number and/or type(s) of data structures, and the storage 630 may be implemented using any number and/or type(s) of volatile and/or non-volatile memory(-ies), memory device(s) and/or storage device(s), such as a hard disk drive. Example control variables that may be stored in the example storage 630 include, but are not limited to, the externally provided position value PPP, the sensitivity value SENSITIVITY, and the estimated travel endpoint values HI_CAL and LO_CAL.

To allow a user to provide the position value PPP and/or the sensitivity value SENSITIVITY, the example valve position controller 104 of FIG. 6 includes any type of user interface 635, any number and/or type of input device(s) 640, and any type of display 645. In some examples, the user interface 635 presents a prompt via the display 645 that indicates to a user and/or prompts the user to provide and/or enter the values PPP and/or SENSITIVITY. Example input devices 640 include, but are not limited, to a digital communications interface and/or a keypad. In some examples, a touch screen may be used to implement both the display 645 and the input device 640.

While an example manner of implementing the example valve position controller 104 of FIG. 1 has been illustrated in FIG. 6, one or more of the interfaces, data structures, elements, processes and/or devices illustrated in FIG. 6 may be combined, divided, re-arranged, omitted, eliminated and/or implemented in any other way. Further, the example position sensor interface 605, example calibrator 615, the example endpoint estimator 617, the example endpoint adjuster 619, the example control signal interface 620, the example pressure controller 625, the example storage 630, the example user interface 635, the example input device(s) 640, the example display 645 and/or, more generally, the valve position controller 104 of FIG. 6, may be implemented by hardware, software, firmware and/or any combination of hardware, software and/or firmware. Thus, for example, any of the example position sensor interface 605, example calibrator 615, the example endpoint estimator 617, the example endpoint adjuster 619, the example control signal interface 620, the example pressure controller 625, the example storage 630, the example user interface 635, the example input device(s) 640, the example display 645 and/or, more generally, the valve position controller 104 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any claim of this patent incorporating one or more of these elements is read to cover a purely software and/or firmware implementation, at least one of the example position sensor interface 605, example calibrator 615, the example endpoint estimator 617, the example endpoint adjuster 619, the example control signal interface 620, the example pressure controller 625, the example storage 630, the example user interface 635, the example input device(s) 640, the example display 645 and/or, more generally, the valve position controller 104 are hereby expressly defined to include a tangible computer-readable medium. Example tangible computer-readable media include, but are not limited to, a flash memory, a compact disc (CD), a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 16. Combinations of the above are also included within the scope of tangible computer-readable media. Further still, the example valve position controller 104 may include interfaces, data structures, elements, processes and/or devices instead of, or in addition to, those illustrated in FIG. 6, and/or may include more than one of any or all of the illustrated interfaces, data structures, elements, processes and/or devices.

Figure 7:
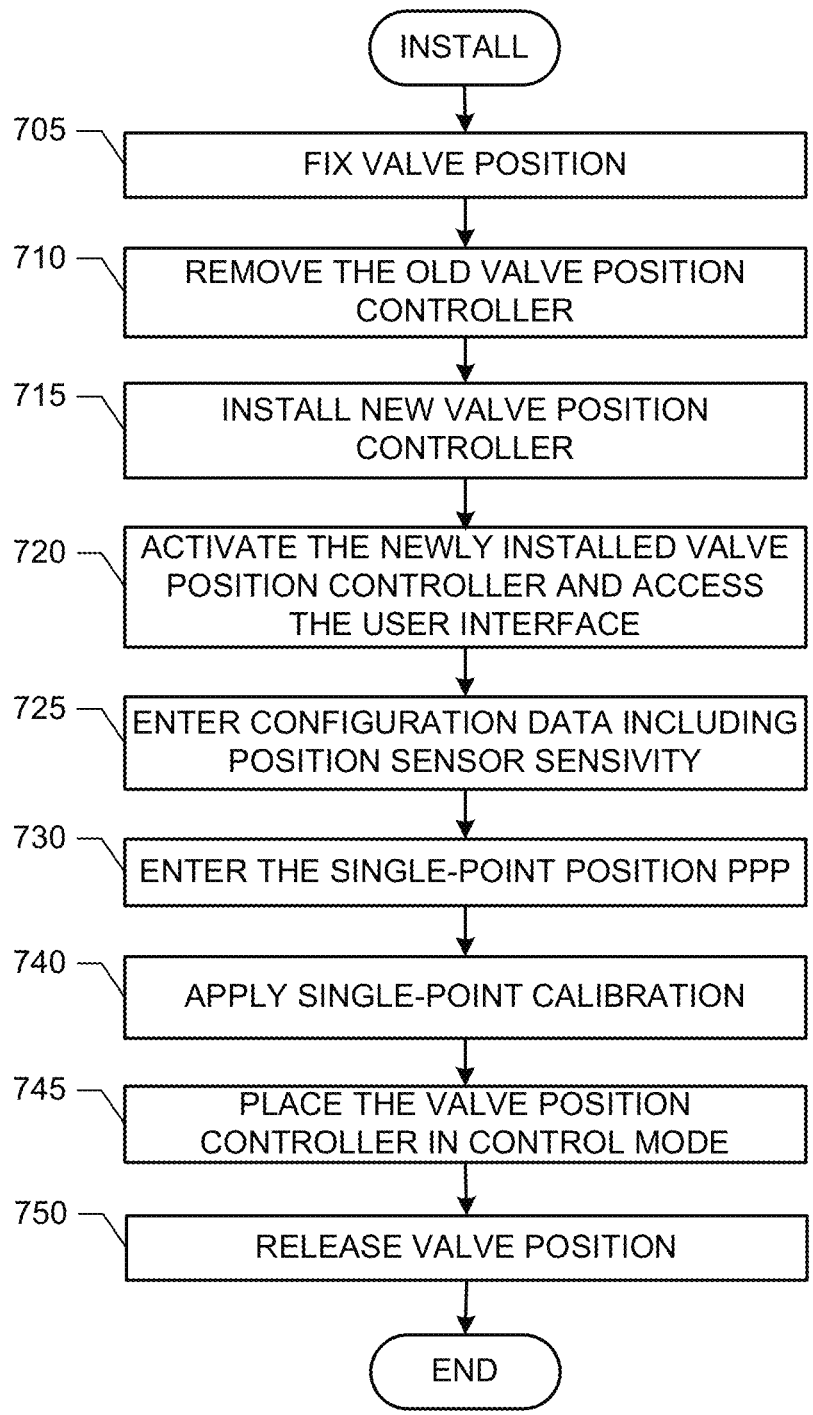
FIG. 7 illustrates an example process that may be carried out to install the example valve position controller of FIGS. 1 and 6.

FIG. 7 illustrates an example process that may be used to install the example valve position controller 104 of FIGS. 1 and 6. FIGS. 8-11 illustrate example processes that may be carried out to implement the example calibrator 615 of FIG. 6 and/or, more generally, the example valve position controller 104 of FIGS. 1 and 6. A processor, a controller and/or any other suitable processing device may be used and/or programmed to execute the example processes of FIGS. 7-11. For example, the processes of FIGS. 7-11 may be embodied in coded and/or machine accessible instructions stored on any article of manufacture such as a tangible computer-readable medium such as a flash memory, a CD, a DVD, a floppy disk, a ROM, a RAM, a PROM, an EPROM, and/or an EEPROM, an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 16. Combinations of the above are also included within the scope of computer-readable media. Machine-readable instructions comprise, for example, instructions and data that cause a processor, a computer and/or a machine having a processor to perform one or more particular processes. Alternatively, some or all of the example operations of FIGS. 7-11 may be implemented using any combination(s) of ASIC(s), PLD(s), FPLD(s), FPGA(s), discrete logic, hardware, firmware, etc. Also, one or more of the example operations of FIGS. 7-11 may be implemented manually or as any combination of any of the foregoing techniques, for example, any combination of firmware, software, discrete logic and/or hardware. Further, many other methods of implementing the example operations of FIGS. 7-11 may be employed. For example, the order of execution of the blocks may be changed, and/or one or more of the blocks described may be changed, eliminated, sub-divided, or combined. Additionally, any or all of the example machine processes of FIGS. 7-11 may be carried out sequentially and/or carried out in parallel by, for example, separate processing threads, processors, devices, discrete logic, circuits, etc.

The example process of FIG. 7 begins with an operator and/or installer fixing or securing (e.g., manually securing) the position of the valve assembly 102 with the example holder 190 (block 705). For example, the operator can manually secure the valve 106 using clamps and/or blocks, or may fix the position of the actuator 108 by preventing movement of (e.g., trapping) the control fluid within the actuator 108.

The valve position controller to be replaced is removed (block 710), and the replacement and/or new valve position controller 104 is installed (block 715). The installer activates (e.g., provides power to) the valve position controller 104 and accesses the user interface 635 (block 720). The installer enters configuration data such as, for example, the sensitivity value SENSITIVITY of the position sensor 110 (e.g., retrieved from a plate or label on the position sensor 110) (block 725). The installer then enters the single-point position PPP of the position indictor 140 (block 730). In some example, the position PPP is entered as a percentage of the travel span (e.g., 50% open) of the actuator 108.

Based on the entered information, the valve position controller 104 calculates the calibration values LO_CAL and HI_CAL, and the installer applies these values (block 740).

The installer places the valve position controller 104 in the active state (block 745) and unsecures or releases the position of the valve assembly 102 (block 750).

The example processes of FIGS. 8-11 are carried out each time the valve position controller 104 is instructed to change the position of the valve assembly 102 via the control signal 180 and while the valve position controller 104 is changing the position of the valve assembly 102 in response to such a command. The example process of FIG. 8 corresponds to the illustrated examples of FIGS. 3 and 5. The example process of FIG. 9 corresponds to a calibration value update based on the example EQNS (6)-(9). The example process of FIG. 10 corresponds to a calibration value update based on a saved PTV 170 when a travel stop is reached. The example process of FIG. 11 corresponds to a calibration value update for an out of range SP 180. Prior to the example processes of FIGS. 8-11 being carried out the first time (e.g., when the valve position controller 104 is activated into an automatic control mode), the example endpoint estimator 617 of FIG. 6 computes the initial estimated HI_CAL and LO_CAL, as described above in connection with FIGS. 1 and 6.

Figure 8:
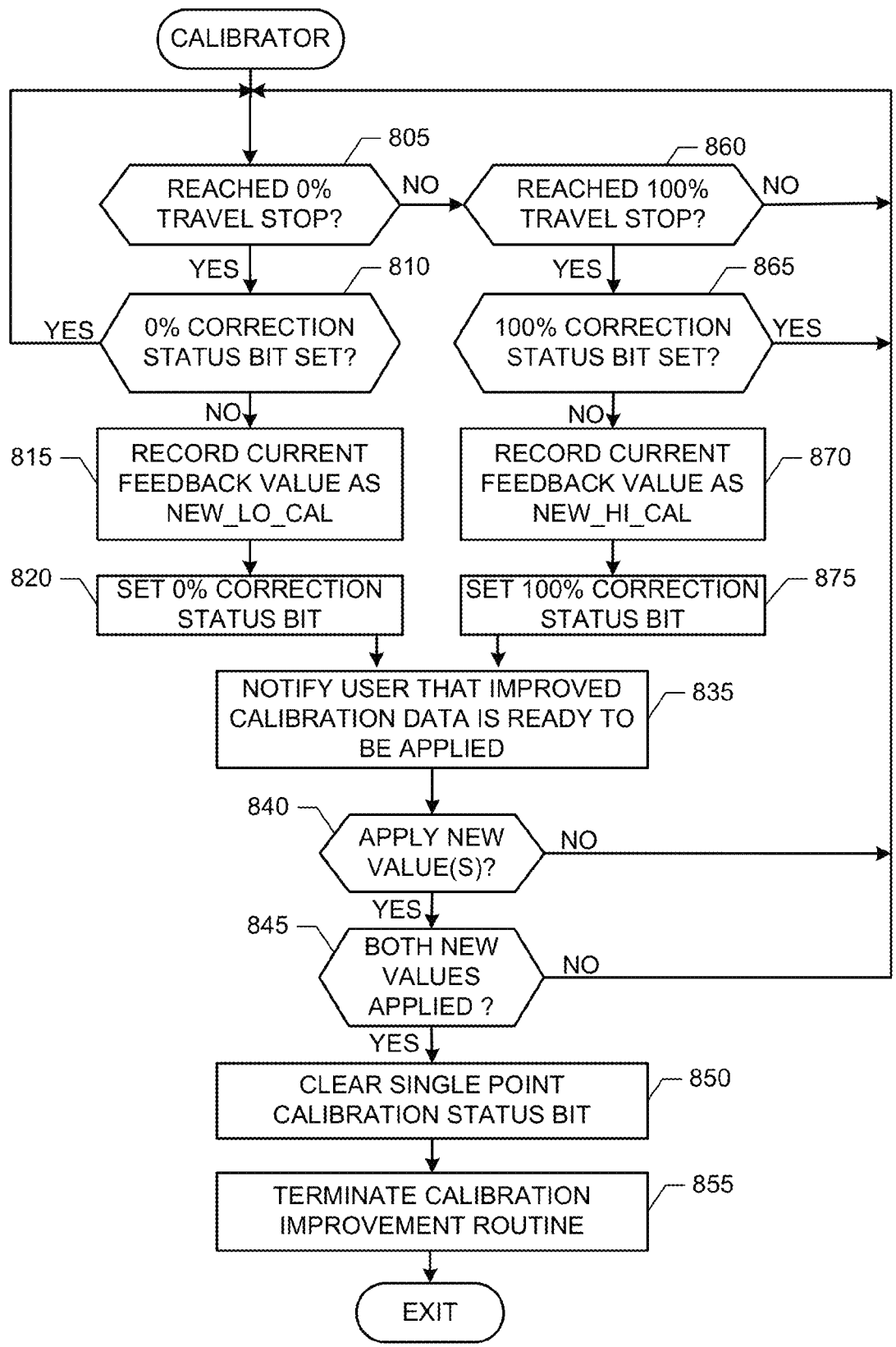
FIGS. 8-11 illustrate example processes that may be carried out to calibrate and/or to implement the example valve position controller of FIGS. 1 and 6.

In the example process of FIG. 8, a pair of correction status bits 0% and 100%, and a single-point calibration status bit are discussed. The 0% and 100% correction status bits are cleared and the single-point calibration status bit is set when single-point calibration has completed. The 0% and 100% correction status bits indicate whether or not the valve 106 and the actuator 108 have reached the 0% and 100% travel limits, respectively, since the single-point calibration was done. The single-point calibration status bit indicates that a single point calibration (potentially inaccurate) was done (e.g., a block 740 of FIG. 7) and has not yet been improved. In the example of FIG. 8, the values NEW_LO_CAL and NEW_HI_CAL are new calibration values that have been computed and/or set, but that are not applied until the user chooses to do so. The example process of FIG. 8 begins with the example valve controller 610 determining whether the actuator 108 has reach the fully-closed 0% position (block 805). If the fully-closed 0% position has been reached (e.g., has reached the 0% travel stops 162) (block 805), the endpoint adjuster 619 determines whether a status bit corresponding to calibration of the fully-closed or 0% position has been set (e.g., a 0% correction status bit) (block 810). If the fully-closed 0% status bit has been set (block 810), control returns to block 805 to check whether the 0% travel stop has been reached.

If the fully-closed status bit has not been set (e.g., the NEW_LO_CAL value has not yet been set) (block 810), the endpoint adjuster 619 records the current value LO_ACT of the feedback signal 170 as NEW_LO_CAL (block 815) and sets the fully-closed status bit (block 820). The calibrator 615 notifies a user (e.g., via the example display 645) that new and/or improved calibration data is ready to be applied (block 835). If the user does not apply the new value(s) (block 840), the user will be repeatedly informed of the available improved data and control returns to block 805 to check whether the 0% travel stop has been reached.

If the user applies only one of the new values (block 845), the user will be repeatedly informed of the available improved data and control returns to block 805 to check whether the 0% travel stop has been reached. If both NEW_LO_CAL and NEW_HI_CAL are applied (block 845), the updated endpoint values LO_CAL, HI_CAL are stored in the example storage 630, and the single point calibration status bit is cleared indicating that any potential inaccuracies have been corrected (block 850). Execution of the example calibrator 615 is terminated (block 855), and control then exits from the example process of FIG. 8.

Returning to block 805, if the fully-closed 0% travel stop has not been reached (block 805), the valve controller 610 determines whether the fully-open 100% travel stop has been reached (block 860). If the fully-open 100% travel stop has not been reached at block 860, the control returns to block 805 to check whether the 0% travel stop has been reached.

If the fully-open 100% position has been reached (block 860), the endpoint adjuster 619 determines whether the fully-open 100% status bit has been set (block 865). If the fully-open 100% status bit has been set (block 865), control returns to block 805 to check whether the 0% travel stop has been reached.

If the fully-open 100% status bit has not been set (e.g., the NEW_HI_CAL value has not yet been set) (block 865), the endpoint adjuster 619 records the current value HI_ACT of the feedback signal 170 as NEW_HI_CAL (block 870), and sets the fully-open 100% status bit (block 875). Control then proceeds to block 835 to notify the user of the new calibration data.

Figure 9:
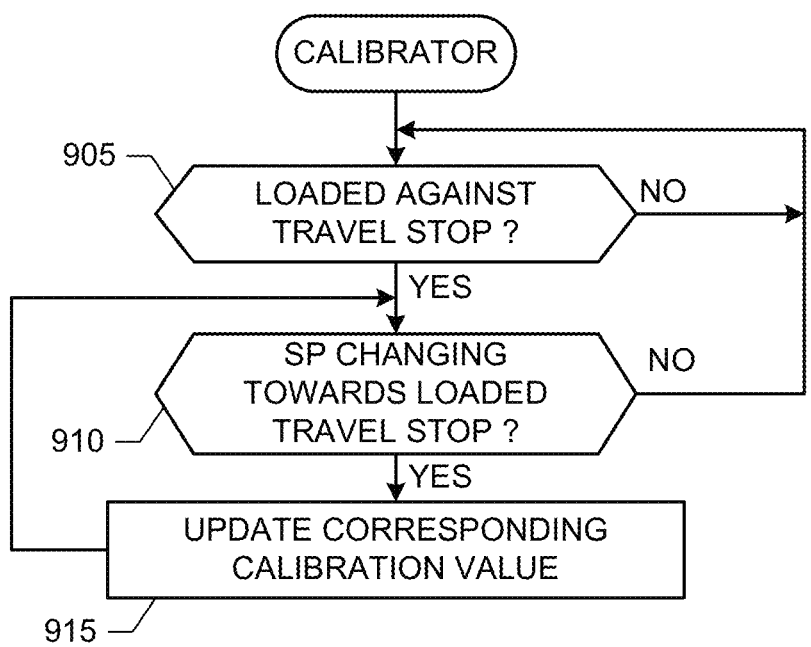

The example process of FIG. 9 begins with the example endpoint adjuster 619 waiting for the piston 130 to become loaded against either of the stops 160, 162 (block 905). When the piston 130 becomes loaded (block 905), the endpoint adjuster 619 determines whether the SP 180 is changing toward the stop 160, 162 (block 910). If the SP 180 is changing toward the loaded stop 160, 162 (block 910), the endpoint adjuster 619 updates the corresponding calibration value HI_CAL, LO_CAL using a corresponding one of EQNS (6)-(9) (block 915).

When the SP 180 is no longer changing toward the loaded stop 160, 162 (block 910), control returns to block 905 to determine whether the piston 130 is loaded against a mechanical limit 160, 162. In the example of FIG. 9, updated calibration values HI_CAL and LO_CAL are automatically applied. Additionally or alternatively, if the updated calibration value HI_CAL, LO_CAL are not to be automatically applied a notification and new calibration data application process substantially similar to that described above in connection with blocks 835, 840, 845, 850 and 855 of FIG. 8 may be carried out.

Figure 10:
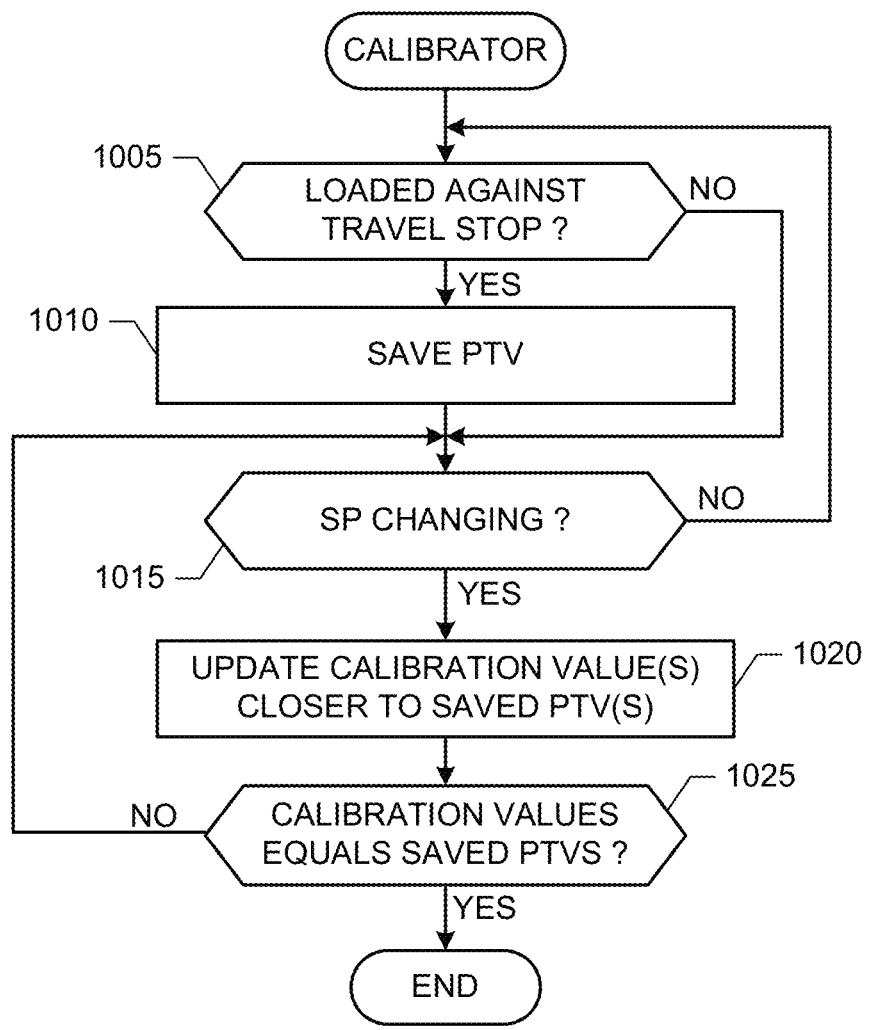

The example process of FIG. 10 begins with the example endpoint adjuster 619 determining whether the piston 130 is loaded against either of the stops 160, 162 (block 1005). If the piston 130 is loaded (block 1005), the endpoint adjuster 619 saves the current PTV 170 (block 1010), and determines whether the SP 180 is changing toward the stop 160, 162 (block 1015). If the SP 180 is changing toward the loaded stop 160, 162 at block 1015, the control returns to block 1005. If the SIP 180 is changing toward the loaded stop 160, 162 (block 1015), the endpoint adjuster 619 updates the corresponding calibration value(s) HI_CAL, LO_CAL toward, but not necessarily equal to, the respective saved PTV(s) 170 (block 1020). For example, the calibration value HI_CAL, LO_CAL is updated a percentage of the difference between the calibration value HI_CAL, LO_CAL and the respective saved PTV 170. When the updated calibration values HI_CAL and LO_CAL equal their respective saved PTV value (block 1025), control exits from the example process of FIG. 10 because no further calibration value adjustments are possible and/or necessary. If either of updated calibration values HI_CAL and LO_CAL does not equal its respective saved PTV (block 1025), control returns to block 1015.

Returning to block 1005, if the piston 130 is not loaded (block 1005), control proceeds to block 1015 to determine whether the SP 180 is changing.

In the example of FIG. 10, updated calibration values are automatically applied. Additionally or alternatively, if the updated calibration value(s) are not to be automatically applied a notification and new calibration data application process substantially similar to that described above in connection with blocks 835, 840, 845, 850 and 855 of FIG. 8 may be carried out.

Figure 11:
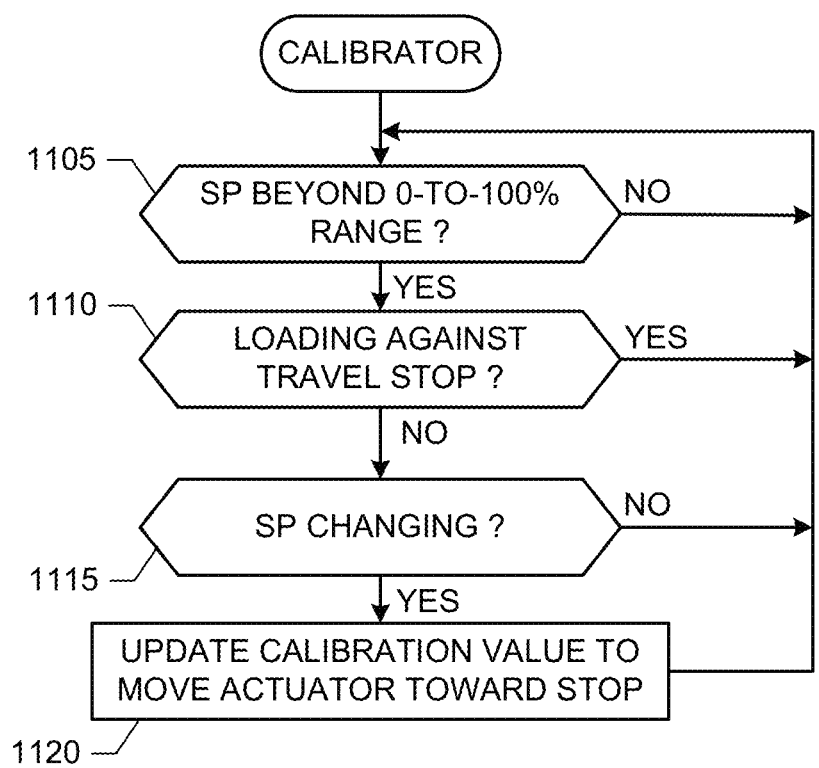

The example process of FIG. 11 begins with the example endpoint adjuster 619 waiting for SP 180 to fall outside the 0-to-100% range (block 1105). When the SP 180 is outside the 0-to-100% range (block 1105), the endpoint analyzer 619 determines whether the piston 130 is loaded against either of the stops 160, 162 (block 1110). If the piston 130 is loaded (block 1110), control returns to block 1105.

If the piston 130 is not loaded (block 1110) and the SP is changing (block 1115), the endpoint adjuster 619 adjusts the corresponding calibration value HI_CAL, LO_CAL such that the piston 130 moves toward the corresponding stop 160, 162 (block 1120).

When the SP 180 is not changing (block 1115), the piston 130 becomes loaded against a mechanical limit 160, 162 (block 1110), or the SP 180 moves back within the 0 to 100% range (block 1105), control returns to block 1105 to wait for the SP 180 to again move beyond the 0 to 100% range.

In the example of FIG. 11, updated calibration values are automatically applied. Additionally or alternatively, if the updated calibration value(s) are not to be automatically applied a notification and new calibration data application process substantially similar to that described above in connection with blocks 835, 840, 845, 850 and 855 of FIG. 8 may be carried out.

Figure 12:
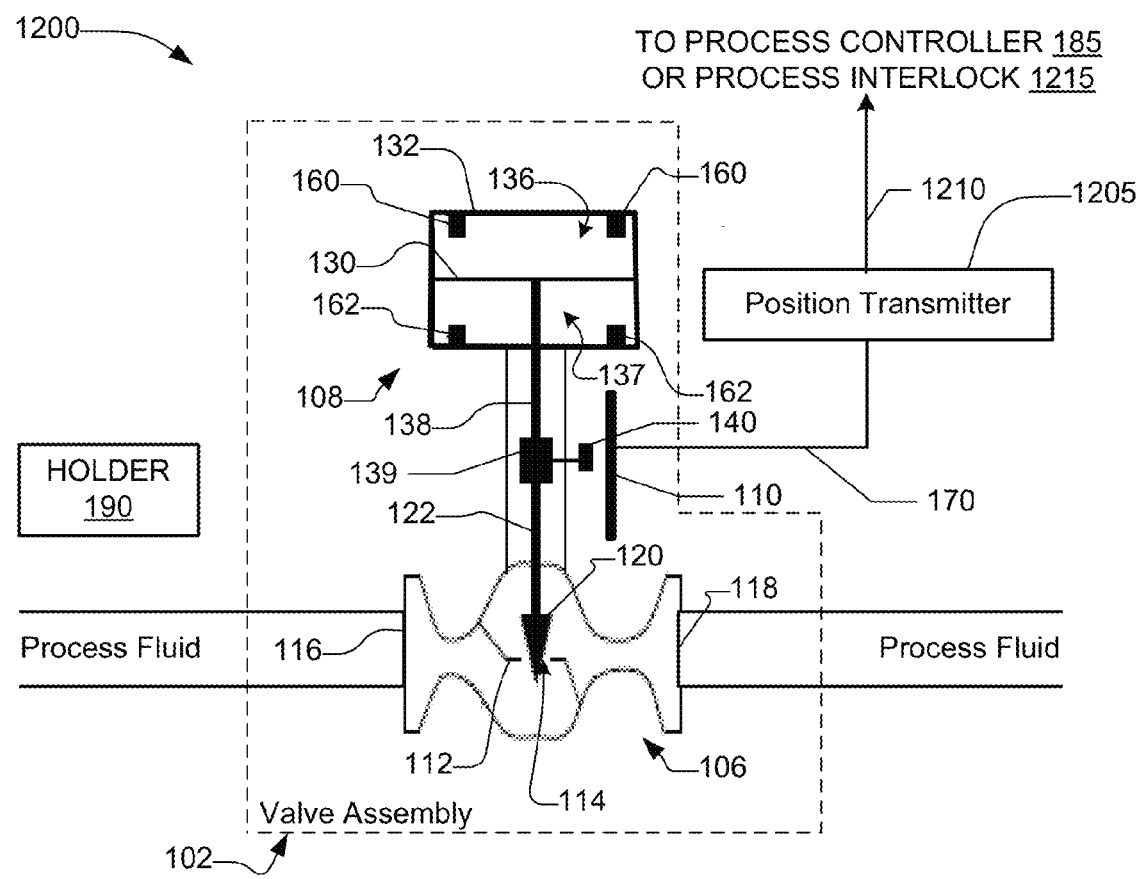
FIG. 12 illustrates an example valve apparatus having a position transmitter that can be calibrated using the example methods and apparatus described herein.

FIG. 12 illustrates an example valve apparatus 1200 including the example valve assembly 102, and a position transmitter 1205 constructed in accordance with the teachings of this disclosure. Because elements of the example apparatus 1200 of FIG. 12 are identical to those discussed above in connection with the example apparatus 100 of FIG. 1, the description of identical elements is not repeated here. Instead, identical elements are designated with identical reference numerals in FIGS. 1 and 12, and the interested reader is referred back to the descriptions presented above in connection with FIG. 1 for a complete description of those identically numbered elements.

To provide a position signal (POS_SIG) 1210 representative of positions of the valve assembly 102 to, for example, the example process controller 185, and/or a monitoring system, a monitoring device, an automatic shutdown system and/or a process interlock 1215, the example valve apparatus 1200 of FIG. 12 includes the example position transmitter 1205. The example position transmitter 1205 of FIG. 12 computes and/or determines the value of POS_SIG 1210 from the PTV 170. For example, the position transmitter 1205 may compute POS_SIG 1210 using the following mathematical expression $$\text{POS\_SIG} = \frac{PTV - \text{LO\_CAL}}{\text{HI\_CAL} - \text{LO\_CAL}}(\text{MAX} - \text{MIN}) + \text{MIN}, \quad \text{EQN (10)}$$

where MAX is the value of POS_SIG 1210 corresponding to a fully open valve and MIN is the value of POS_SIG 1210 corresponding to a fully closed valve. In some examples, MIN is 4 mA and MAX is 20 mA. The values of LO_CAL and HI_CAL are computed, selected and/or updated by the position transmitter 1205 as described below.

Figure 13:
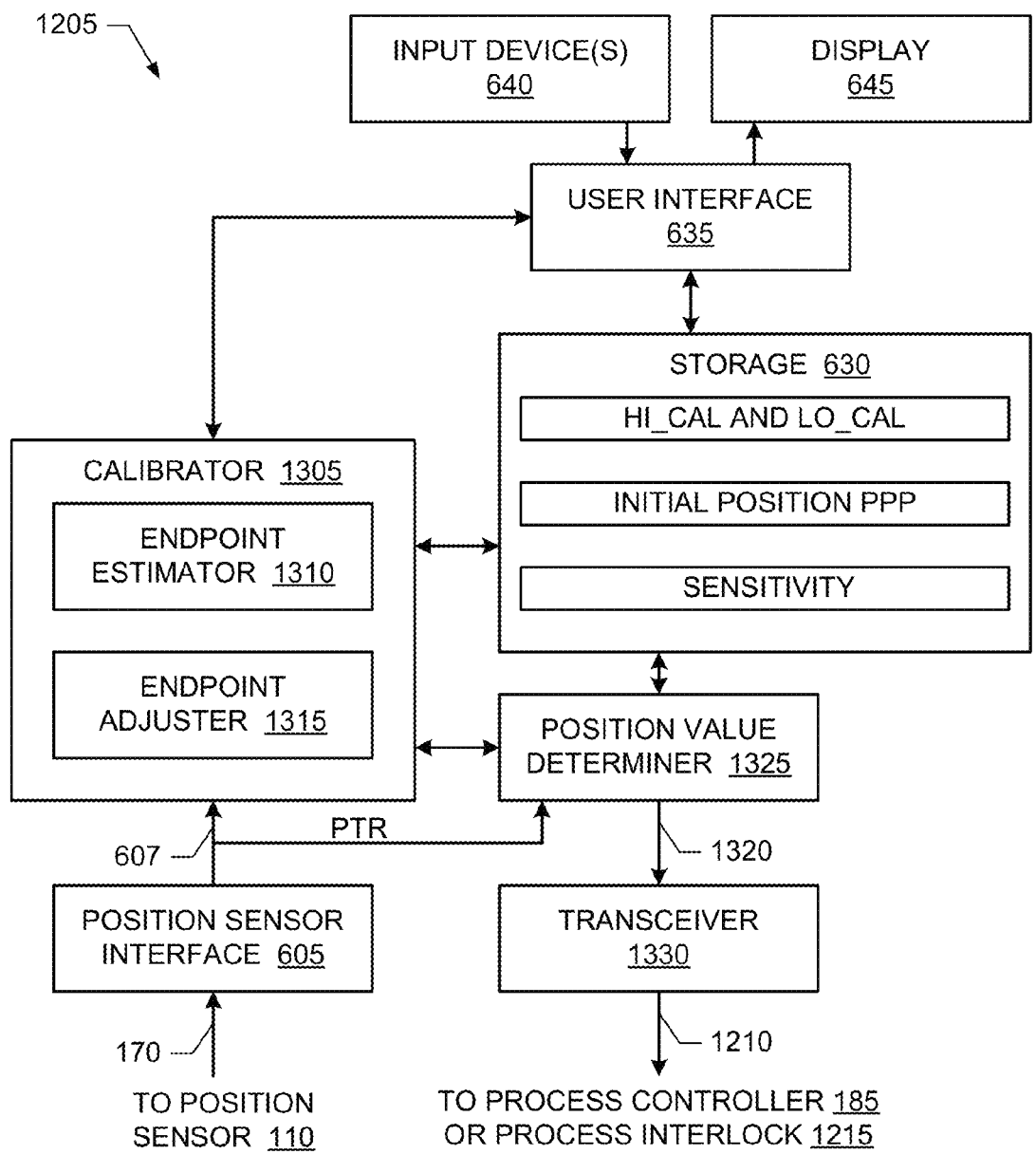
FIG. 13 illustrates an example manner of implementing the example position transmitter of FIG. 12.

The example position transmitter 1205 of FIG. 12 can self-calibrate from a single externally-provided position value PPP that represents the current position (e.g., 70% open) of the actuator 108, or an estimate and/or approximation thereof. As described herein, no additional externally-provided position values are needed by the position transmitter 1205 prior to start of operation of the valve apparatus 1200 within a process plant. Further, the position of the actuator 108 need not be adjusted, changed or stroked prior to operation of the example valve apparatus 1200 of FIG. 12 within the process plant. The single position value PPP may be easily and/or readily determined and/or estimated by an installer by, for example, visually examining (e.g., estimating) and/or measuring the current position of the position indicator 140 during, for example, installation of the position transmitter 1205. The installer provides and/or inputs the estimated or measured position PPP into the position transmitter 1205 via, for example, an input device 640 of the position transmitter 1205 (FIG. 13). While the example position transmitter 1205 may self-calibrate based on the single estimated position value PPP, when additional position values are available, either estimated or measured values provided by an installer and/or determined by stroking the valve 106, such additional values may be utilized to, for example, improve calibration accuracy.

Based on the single estimated position value PPP and the sensitivity value SENSITIVITY that represents a change in the PTV 170 per unit of distance of travel of the position indicator 140, and a total distance of travel of the valve and actuator, the example position transmitter 1205 of FIG. 12 estimates PTVs 170 that are expected and/or predicted to correspond to travel endpoints of the valve actuator 108. Alternatively, the value SENSITIVITY represents the number of counts that represent a full stroke of the valve 106. Further still, the value SENSITIVITY can represent the change in PTV 170 over a full stroke of the valve 106. Referring to FIG. 5, at a time T1, the example valve assembly 102 of FIG. 12 is 75% open and has a PTV 170 corresponding to the current 75% position, would have a PTV 170 of HI_ACT when the actuator 108 is in the fully-open 100% position, and would have a PTV value 170 of LO_ACT when the actuator 108 is in the fully-closed 0% position. At a time T2, the position transmitter 1205 computes a first value HI_CAL corresponding to an estimated or expected fully-open position of the actuator 108, and computes a second value LO_CAL corresponding to an estimated or expected fully-closed position of the actuator 108. If the values of PPP and SENSITIVITY are substantially accurate, the value of HI_CAL is substantially equal to HI_ACT and the value of LO_CAL is substantially equal to LO_ACT. However, in practice, the value of PPP is an estimate (e.g., a measured value having an error) of the position of the actuator 108 and/or the value of SENSITIVITY may be inaccurate due to manufacturing tolerances and/or installation alignment variation. Accordingly, in some examples the example position transmitter 1205 of FIG. 12 purposefully adjusts the estimated endpoint values so that the estimated and/or predicted travel range represented by HI_ACT and LO_ACT encompasses a smaller travel range of the actuator 108, as shown at time T3 in FIG. 5.

The values of HI_ACT and LO_ACT may be computed using the following mathematical expressions, assuming the feedback signal 170 increases as the valve 104 opens:

$$HI\_CAL = PTV + (100 - OFF - PPP) \cdot SENSITIVITY \cdot TRAVEL \cdot (100 - GAIN), \text{ and} \quad \text{EQN (11)}$$

$$LO\_CAL = PTV - (PPP - OFF) \cdot SENSITIVITY \cdot TRAVEL \cdot (100 - GAIN), \quad \text{EQN (12)}$$

where OFF is an allowance (in percentage of travel span) in the estimation of PPP, TRAVEL is the physical stroke length or degrees of rotation of the valve 106 in engineering units, and GAIN is an allowance (in percentage of travel span) in the calibration of the sensor 140, the excitation of the sensor 140, the amplification and/or filtering of the sensor output 170 and/or the analog-to-digital conversion of the sensor output 170.

Using the example mathematical expressions of EQNS (10)-(12), the example position transmitter 1205 is intended to output values of POS_SIGN 1210 corresponding to 0% and 100% valve positions during subsequent operation of the example valve apparatus 1200 within a process plant. In the illustrated example of FIG. 12, the example position transmitter 1205 transmits MAX as the output 1210 representing a 100% open valve prior to the valve 106 actually reaching the fully-open 100% position, and transmits MIN as the output 1210 representing a 0% open valve prior to the valve 106 actually reaching the fully-closed 0% position.

As the example position transmitter 1205 of FIG. 12 operates within a process plant, the example position transmitter 1205 adapts, adjusts and/or updates the estimated endpoint values HI_CAL and LO_CAL. When during operation of the process plant, the software within the position transmitter 1205 calculates a value for POS_SIG 1210 that is outside the range [MIN, MAX], the example position transmitter 1205 adjusts the corresponding calibrated endpoint value HI_CAL, LO_CAL. For example, when POS_SIG 1210 is calculated to exceed MAX, the position transmitter 1205 updates the value of HI_CAL to match the current value PTV 170. Likewise, when POS_SIG 1210 is calculated to be less than MIN, the position transmitter 1205 updates the value of LO_CAL to match the current PTV 170. By updating the values of HI_CAL and LO_CAL each time POS_SIG 1210 is calculated to be outside the range [MIN, MAX] the calibration of the example position transmitter 1205 is improved over time. When the valve 106 actually reaches the fully-open 100% or the fully-closed 0% position, the corresponding HI_CAL or LO_CAL calibration value becomes substantially ideal. Preferably, the position feedback 170 is filtered to reduce the effects of noise such that calibration errors are not introduced and/or caused by the noise.

The example position transmitter 1205 of FIG. 12 may automatically apply and/or activate new LO_CAL and HI_CAL values as they are computed, as described in the preceding paragraph, and/or new LO_CAL and/or HI_CAL values may be stored and only activated and/or applied when the position transmitter 1205 is specifically instructed and/or directed. For example, the position transmitter 1205 may display an indicator on a display 645 (FIG. 13) indicating that one or more new calibration values LO_CAL, HI_CAL are available for activation. When via, for example, the example input device(s) 640 (FIG. 13), a user indicates that the new and/or updated calibration values LO_CAL, HI_CAL are to be applied, the position transmitter 1205 begins using the activated calibration values LO_CAL, HI_CAL to compute subsequent values of POS_SIG 1210.

FIG. 13 illustrates an example manner of implementing the example position transmitter 1205 of FIG. 12. Because elements of the example position transmitter 1205 of FIG. 13 are identical to those discussed above in connection with the example valve position controller 104 of FIG. 6, the description of identical elements is not repeated here. Instead, identical elements are designated with identical reference numerals in FIGS. 6 and 13, and the interested reader is referred back to the descriptions presented above in connection with FIG. 6 for a complete description of those identically numbered elements.

To determine, compute and update the estimated values HI_CAL and LO_CAL, the example position transmitter 1205 of FIG. 13 includes a calibrator 1305. To compute the initial pair of estimated values HI_CAL and LO_CAL based on the single externally-provided position value PPP, the example calibrator 1305 of FIG. 13 includes an endpoint estimator 1310. Using, for example, the mathematical expressions of EQNS (11) and (12), the example endpoint estimator 1310 of FIG. 13 computes the initial values HI_CAL and LO_CAL.

To update during operation of the example valve apparatus 1200 of FIG. 12 within a process plant the values HI_CAL and LO_CAL, the example calibrator 1305 of FIG. 13 includes an endpoint adjuster 1315. The example endpoint adjuster 1315 of FIG. 13 updates the values of HI_CAL and LO_CAL during on-line operation of the position transmitter 1205. When during operation, POS_SIG 1210 is calculated to be outside the range [MIN, MAX], the example endpoint adjuster 1315 adjusts the corresponding calibrated endpoint value HI_CAL, LO_CAL to the current value of the digital value 607. It should be understood that the example endpoint adjuster 1315 could, additionally or alternatively, be used to compute and/or update the HI_CAL and LO_CAL were the valve 106 to be purposefully stroked for calibration purposes.

To compute a digital representation 1320 of POS_SIG 1210, the example position transmitter 1205 of FIG. 13 includes a position value determiner 1325. The example position value determiner 1325 of FIG. 13 computes the value(s) of the digital signal 1320 based on the calibration values HI_CAL and LO_CAL by, for example, implementing the example mathematical expression of EQN (10).

To transmit and/or provide POS_SIG 1210 to the process controller 185 and/or the process interlock 1215, the example position transmitter 1205 of FIG. 13 includes any type of transmitter or transceiver 1330. An example transmitter 1330 of FIG. 13 converts the digital value(s) 1320 into an analog signal, such as a 4-20 mA signal, using any number and/or type(s) of circuit(s), device(s) and/or method(s). Additionally or alternatively, the transceiver 1330 may digitally and/or wirelessly transmit the digital value(s) 1320 as the signal 1210.

While an example manner of implementing the example position transmitter 1205 of FIG. 12 has been illustrated in FIG. 13, one or more of the interfaces, data structures, elements, processes and/or devices illustrated in FIG. 13 may be combined, divided, re-arranged, omitted, eliminated and/or implemented in any other way. Further, the example position sensor interface 605, example calibrator 1305, the example endpoint estimator 1310, the example endpoint adjuster 1315, the example storage 630, the example user interface 635, the example input device(s) 640, the example display 645, the example position value determiner 1325, the example transmitter/transceiver 1330 and/or, more generally, the position transmitter 1205 of FIG. 13, may be implemented by hardware, software, firmware and/or any combination of hardware, software and/or firmware. Thus, for example, any of the example position sensor interface 605, example calibrator 1305, the example endpoint estimator 1310, the example endpoint adjuster 1315, the example storage 630, the example user interface 635, the example input device(s) 640, the example display 645, the example position value determiner 1325, the example transmitter/transceiver 1330 and/or, more generally, the position transmitter 1205 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any claim of this patent incorporating one or more of these elements is read to cover a purely software and/or firmware implementation, at least one of the example position sensor interface 605, example calibrator 1305, the example endpoint estimator 1310, the example endpoint adjuster 1315, the example storage 630, the example user interface 635, the example input device(s) 640, the example display 645, the example position value determiner 1325, the example transmitter/transceiver 1330 and/or, more generally, the position transmitter 1205 are hereby expressly defined to include a tangible computer-readable medium. Example tangible computer-readable media include, but are not limited to, a flash memory, a compact disc (CD), a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 16. Combinations of the above are also included within the scope of tangible computer-readable media. Further still, the example position transmitter 1205 may include interfaces, data structures, elements, processes and/or devices instead of, or in addition to, those illustrated in FIG. 12, and/or may include more than one of any or all of the illustrated interfaces, data structures, elements, processes and/or devices.

Figure 14:
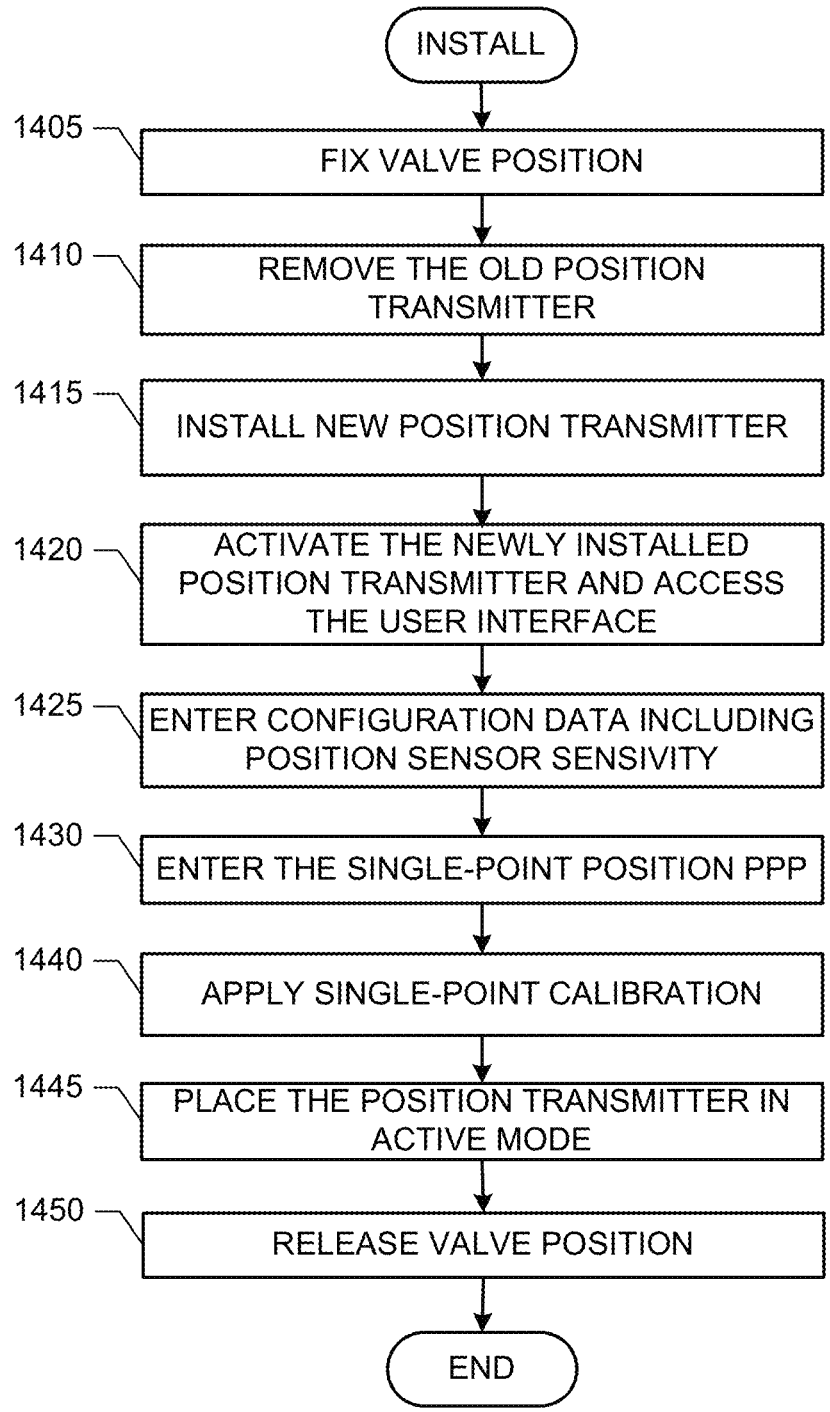
FIG. 14 illustrates an example process that may be carried out to install the example position transmitter of FIGS. 12 and 13.
Figure 15:
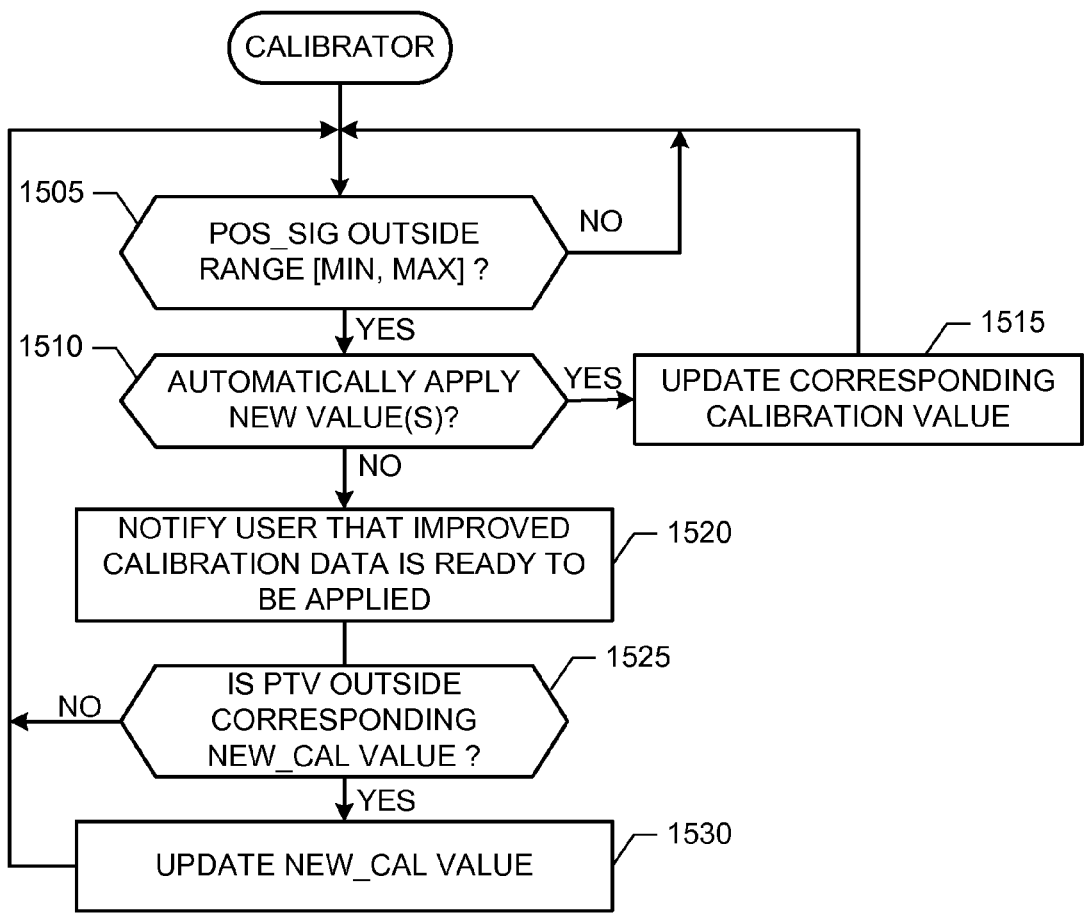
FIG. 15 illustrates an example processes that may be carried out to calibrate and/or to implement the example position transmitter of FIGS. 12 and 13.

FIG. 14 illustrates an example process that may be carried out to install the example position transmitter 1205 of FIGS. 12 and 13. FIG. 15 illustrates an example process that may be carried out to implement the example calibrator 1305 of FIG. 13 and/or, more generally, the example position transmitter 1205 of FIGS. 12 and 13. A processor, a controller and/or any other suitable processing device may be used and/or programmed to execute the example processes of FIGS. 14 and 15. For example, the processes of FIGS. 14 and 15 may be embodied in coded and/or machine accessible instructions stored on any article of manufacture such as a tangible computer-readable medium that can be accessed by a processor, a computer and/or other machine having a processor, such as the example processor platform P100 discussed below in connection with FIG. 16. Alternatively, some or all of the example operations of FIGS. 14 and 15 may be implemented using any combination(s) of ASIC(s), PLD(s), FPLD(s), FPGA(s), discrete logic, hardware, firmware, etc. Also, one or more of the example operations of FIGS. 14 and 15 may be implemented manually or as any combination of any of the foregoing techniques, for example, any combination of firmware, software, discrete logic and/or hardware. Further, many other methods of implementing the example operations of FIGS. 14 and 15 may be employed. For example, the order of execution of the blocks may be changed, and/or one or more of the blocks described may be changed, eliminated, subdivided, or combined. Additionally, any or all of the example machine processes of FIGS. 14 and 15 may be carried out sequentially and/or carried out in parallel by, for example, separate processing threads, processors, devices, discrete logic, circuits, etc.

The example process of FIG. 14 begins with an operator and/or installer fixing or securing (e.g., manually securing) the position of the valve assembly 102 with the example holder 190 (block 1405). For example, the operator can manually secure the valve 106 using clamps and/or blocks, or may fix the position of the actuator 108 by preventing movement of (e.g., trapping) the control fluid within the actuator 108.

The position transmitter to be replaced is removed (block 1410), and the replacement and/or new position transmitter 1205 is installed (block 1415). The installer activates (e.g., provides power to) the position transmitter 1205 and accesses the user interface 635 (block 1420). The installer enters configuration data such as, for example, the sensitivity value SENSITIVITY of the position sensor 110 (e.g., retrieved from a plate or label on the position sensor 110) (block 1425). The installer then enters the single-point position PPP of the position indictor 140 (block 1430). In some example, the position PPP is entered as a percentage of the travel span (e.g., 50% open) of the actuator 108.

Based on the entered information, the position transmitter 1205 calculates the calibration values LO_CAL and HI_CAL, and the installer applies these values (block 1440).

The installer places the position transmitter 1205 in the active state (block 1445) and unsecures or releases the position of the valve assembly 102 (block 1450).

The example process of FIG. 15 begins with the example endpoint adjuster 1315 waiting for the calculated value of POS_SIG 1210 to fall outside the range [MIN, MAX] (block 1505). When the calculated value of $POS_{13}SIG$ 1210 does not fall outside the range [MIN, MAX] (block 1505), the control returns to block 1505 and the endpoint adjuster 1315 waits for the calculated value of $POS_{13}SIG$ 1210 to fall outside the range [MIN, MAX] (block 1505). When the calculated value of POS_SIG 1210 falls outside the range [MIN, MAX] (block 1505), and calibration improvement is to be automatically applied (block 1510), the endpoint adjuster 1315 updates the corresponding calibration value HI_CAL, LO_CAL to the current value of PTV 170 (block 1515).

If the calibration improvement is not to be automatically applied (block 1510), the endpoint adjuster 1315 notifies a user (e.g., via the example display 645) that new and/or improved calibration data is ready to be applied (block 1520), and determines whether the PTV 170 is outside the previous NEW_CAL value range (block 1525). If the PTV 170 is outside the previous range (block 1525), the endpoint adjuster 1315 stores the updated calibration value NEW_HI_CAL, NEW_LO_CAL for subsequent retrieval and/or activation (block 1530). Control then returns to block 1505 to wait for the value of POS_SIG 1210 to fall outside the range [MIN, MAX]. If the PTV 170 is outside the previous range (block1525), the control returns to block 1505.

Figure 16:
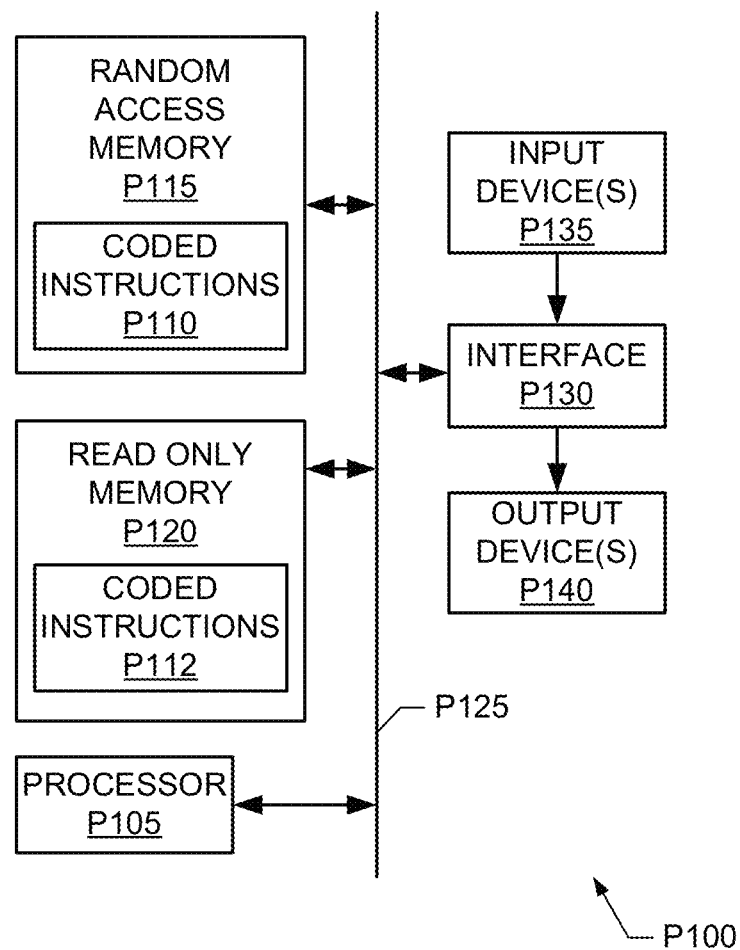
FIG. 16 is a schematic illustration of an example processor platform that may be used and/or programmed to implement the example processes of FIGS. 7-11, 14 and 15 and/or, more generally, to implement the example valve position controller of FIGS. 1 and 6 and/or the example position transmitter of FIGS. 12 and 13.

FIG. 16 is a schematic diagram of an example processor platform P100 that may be used and/or programmed to implement any of the example apparatus and/or methods to calibrate vale position controllers disclosed herein. For example, one or more general-purpose processors, processor cores, microcontrollers, etc can implement the processor platform P100.

The processor platform P100 of the example of FIG. 16 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may carry out, among other things, the example processes of FIGS. 7-11, 14 and/or, more generally, implement the example valve position controller 104 of FIGS. 1 and 6 and/or the example position transmitter 1205 of FIGS. 12 and 13.

The processor P105 is in communication with any number and/or type(s) of tangible computer-readable storage media (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 and P120 may be used to, for example, implement the example storage 630 of FIGS. 6 and 13.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The input devices P135 may be used to implement the example input device(s) 640, and the output devices P140 may be used to implement the example display 645 of FIGS. 6 and 13.

Although certain example methods, apparatus, and systems have been described herein, the scope of coverage of this patent is not limited thereto. On the contrary, this patent covers all methods, apparatus, systems, and articles of manufacture fairly falling within the scope of the appended claims either literally or under the doctrine of equivalents.

What is claimed is:

1. A method comprising:
   securing a position of a flow control member of a control valve assembly to prevent movement of the flow control member;
   installing a controller to the control valve assembly;
   activating a user interface of the controller after the controller is coupled to the control valve assembly;
   entering a position sensor sensitivity value and a single-point position value, the single-point position value being representative of the secured position of the flow control member;
   applying a single-point calibration value;
   placing the controller in a control mode; and
   releasing the position of the flow control member, the controller to self-calibrate during operation of the control valve assembly based on the position sensor sensitivity value and the single-point position value while the control valve assembly is in operation.

2. A method of claim 1, further comprising, prior to installing the controller, removing another controller from the control valve assembly while the control valve assembly is in the field and in-service with a process control system.

3. A method of claim 1, wherein placing the controller in the control mode comprises placing the controller in an active state to enable the control valve assembly to control fluid flow of a process system.

4. A method of claim 1, wherein placing the controller in the control mode comprises activating the controller without stroking the control valve assembly between one travel end point of the flow control member and another travel end point of the flow control member prior to placing the controller in the control mode.

5. A method of claim 1, further comprising selecting a calibration routine of the controller via the user interface.

6. A method of claim 1, wherein entering the single-point position value comprises visually estimating the secured position of the flow control member.

7. A method of claim 6, wherein entering the single-point position value comprises entering the single-point position value as a percentage of a travel span of the flow control member.

8. A method of claim 1, wherein applying the single-point calibration value comprises entering a first estimated calibration value and a second estimated second calibration value, the first and second estimated calibration values being representative of upper and lower travel span limits of the flow control member, respectively.

9. A method of claim 8, further comprising obtaining the estimated first and second calibration values from the controller, the controller to determine the first and second estimated calibration values based on the single-point calibration value and the position sensor sensitivity value.

10. A method comprising:
coupling a controller to a control valve assembly while the control valve assembly is in service or in-line with a process control system;
providing a position sensor sensitivity value to the controller;
providing a single-point position value representative of a current position of a flow control member of the control valve assembly;
inputting an estimated upper stroke limit value representative of a first travel span limit of the flow control member and an estimated lower stroke limit value representative of a second travel span limit of the flow control member based on the position sensor sensitivity value and the single-point position value; and
activating the controller to allow operation of the control valve assembly to control fluid flow of the process control system, the controller to calibrate during operation of the control valve assembly based on the position sensor sensitivity value and the single-point position value.

11. A method of claim 10, wherein providing the position sensor sensitivity value and the single-point position value comprises entering the values in the controller via an input interface.

12. A method of claim 10, wherein determining an estimated upper stroke limit value and an estimated lower stroke limit value comprises causing the controller to calculate the estimated upper and lower stroke limit values based on the provided position sensor sensitivity value and the single-point position value.

13. A method of claim 10, further comprising securing the current position of the flow control member to prevent the flow control member from moving.

14. A method of claim 13, wherein providing the single-point position value comprises estimating the current position of the flow control member relative to a full travel span of the flow control member when the flow control member is secured.

15. A method of claim 14, further comprising releasing the flow control member and activating the controller.

16. A method comprising:
locking a position of a flow control member of a control valve assembly while the valve control assembly is in a fluid system;
initiating a calibration of a controller that operates the control valve assembly;
inputting a pre-determined position sensor sensitivity value to the controller via a user interface;
inputting a single-point position value representative of the locked position of the flow control member relative to a travel span of the flow control member;
obtaining estimated upper and lower calibration values from the controller based on the position sensor sensitivity value and the single-point position value;
inputting the estimated upper and lower calibration values via the user interface;
activating the controller; and
unlocking the flow control member to enable the control valve assembly to control the fluid system, the controller to calibrate based on the single-point position value, the position sensor sensitivity value and the estimated upper and lower calibration values.

17. A method of claim 16, wherein entering the single-point position comprises measuring the position of the flow control member via a position sensor of the control valve assembly.

18. A method of claim 16, further comprises calibrating the controller by activating the controller while the control valve assembly is in-line or in-service with the fluid system and without having to stroke the flow control member or bypass the control valve assembly.

19. A method of claim 16, wherein entering the single-point position value comprises visually estimating the position of the flow control member after the control valve is secured.

20. A method of claim 19, wherein entering the single-point position value comprises entering a value as a percentage of a travel span of the flow control member.

* * * * *